(12) United States Patent
Lai

(10) Patent No.: US 8,773,992 B2
(45) Date of Patent: Jul. 8, 2014

(54) METHODS AND APPARATUS FOR HIERARCHICAL ROUTING IN COMMUNICATION NETWORKS

(75) Inventor: Wai Sum Lai, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 219 days.

(21) Appl. No.: 12/901,945

(22) Filed: Oct. 11, 2010

(65) Prior Publication Data
US 2012/0087377 A1 Apr. 12, 2012

(51) Int. Cl.
*H04L 12/26* (2006.01)

(52) U.S. Cl.
USPC ......... 370/230.1; 370/235; 709/238; 709/241

(58) Field of Classification Search
USPC ............ 370/238, 252, 395.21, 400, 401, 427, 370/539, 451, 230.1, 235; 709/223, 226, 709/229, 238, 239, 241
See application file for complete search history.

(56) References Cited

U.S. PATENT DOCUMENTS

| | | | |
|---|---|---|---|
| 5,920,571 A * | 7/1999 | Houck et al. .................. | 370/458 |
| 6,154,776 A | 11/2000 | Martin | |
| 6,201,810 B1 * | 3/2001 | Masuda et al. ........... | 370/395.32 |
| 6,614,757 B1 * | 9/2003 | Rochberger et al. .......... | 370/231 |
| 6,754,215 B1 | 6/2004 | Arikawa et al. | |
| 6,785,737 B2 * | 8/2004 | Lee et al. ...................... | 709/241 |
| 6,870,811 B2 | 3/2005 | Barker et al. | |
| 7,016,366 B2 | 3/2006 | Kawarai et al. | |
| 7,072,295 B1 | 7/2006 | Benson et al. | |
| 7,177,324 B1 * | 2/2007 | Choudhury et al. .......... | 370/468 |
| 7,185,077 B1 * | 2/2007 | O'Toole et al. ............... | 709/223 |
| 7,269,159 B1 * | 9/2007 | Lai ................................ | 370/352 |
| 7,301,911 B2 * | 11/2007 | Mack-Crane et al. ........ | 370/254 |
| 7,319,700 B1 | 1/2008 | Kompella | |
| 7,346,056 B2 * | 3/2008 | Devi .............................. | 370/392 |
| 7,430,176 B2 | 9/2008 | Nalawade et al. | |
| 7,500,013 B2 * | 3/2009 | Dziong et al. ................ | 709/238 |
| 7,561,512 B1 * | 7/2009 | Chellappa et al. ............ | 370/217 |
| 7,581,022 B1 * | 8/2009 | Griffin et al. ................. | 709/238 |
| 7,602,796 B2 | 10/2009 | Scudder et al. | |
| 7,616,576 B2 * | 11/2009 | Li et al. ......................... | 370/238 |
| 7,647,426 B2 | 1/2010 | Patel et al. | |

(Continued)

FOREIGN PATENT DOCUMENTS

WO 9858474 12/1998

OTHER PUBLICATIONS

Technical Committee, "Private Network-Network Interface," ATM Forum, Apr. 2002, 536 pages, Specification Version 1.1.
Tam et al., "Quality-of-Service Routing with Path Information Aggregation," Computer Networks, Mar. 8, 2007, 46 pages.
Lai et al., "A Graph-Theoretic Model of Routing Hierarchies," IEE International Conference on Advanced Information Networking and Applications Workshop (WAINA 2009), University of Bradford, UK, May 26-29, 2009, pp. 1118-1123 (6 pages).

(Continued)

*Primary Examiner* — Brian O'Connor
(74) *Attorney, Agent, or Firm* — Hanley, Flight & Zimmerman, LLC

(57) ABSTRACT

Methods and apparatus for hierarchical routing in communication networks are disclosed. An example hierarchical routing method for a communication network disclosed herein comprises determining a plurality of constrained weighted paths to connect pairs of border nodes of a cluster in the communication network, each constrained weighted path having a respective bandwidth and a respective weight, a constrained weighted path for a pair of border nodes of the cluster being selected, based on a bandwidth threshold, from a set of possible paths capable of connecting the pair of border nodes, and advertising the plurality of constrained weighted paths determined for the cluster.

20 Claims, 16 Drawing Sheets

(56) References Cited

U.S. PATENT DOCUMENTS

| | | | |
|---|---|---|---|
| 7,729,337 B2 * | 6/2010 | Saleh et al. | 370/351 |
| 7,872,983 B2 * | 1/2011 | Lai et al. | 370/252 |
| 7,904,586 B1 * | 3/2011 | Griffin et al. | 709/238 |
| 7,961,753 B1 * | 6/2011 | Choudhury et al. | 370/458 |
| 7,969,886 B1 * | 6/2011 | Hoichman | 370/235 |
| 8,059,659 B1 * | 11/2011 | Choudhury et al. | 370/395.41 |
| 2009/0116511 A1 | 5/2009 | Anderson et al. | |
| 2009/0274159 A1 | 11/2009 | Xia et al. | |
| 2009/0316699 A1 * | 12/2009 | Mark et al. | 370/392 |
| 2010/0008361 A1 | 1/2010 | Guichard et al. | |
| 2011/0060844 A1 * | 3/2011 | Allan et al. | 709/241 |

OTHER PUBLICATIONS

Lai, "Hierarchical Routing with QoS," SimulationWorks 2010, Mar. 15-19, 2010, Torremolinos, Malaga, Spain, 7 pages.

Lai et al., "Analysis and Design of AT&T's Global PNNI Network," IEEE Pacific Rim Conference on Communications, Computers, and Signal Processing (PACRIM 2005), Victoria, B.C., Canada, Aug. 24-26, 2005, pp. 129-132 (4 pages).

Rosen et al., "Multiprotocol Label Switching Architecture," The Internet Society, Jan. 2001, 55 pages.

* cited by examiner

METHODS AND APPARATUS FOR HIERARCHICAL ROUTING IN COMMUNICATION NETWORKS

FIELD OF THE DISCLOSURE

This disclosure relates generally to communication networks and, more particularly, to methods and apparatus for hierarchical routing in communication networks.

BACKGROUND

In hierarchical routing, the nodes of a communication network are grouped (e.g., classified) into different clusters. The clusters at a particular level of the routing hierarchy can be grouped into higher-level clusters, and this process can iterate recursively. At the highest level of the routing hierarchy, there is a single top-level cluster representing the entire network. Typically, each cluster is represented by a single logical node at the next higher level of the routing hierarchy. The ability to use a single logical node to represent a cluster of connected nodes limits the number of topological elements generating updates on their states, which can significantly improve network scalability. To simplify routing across the clusters, each cluster advertises only a summary, or an aggregated view, of its internal structure to other nodes (which may be single nodes or other clusters) outside the cluster.

DETAILED DESCRIPTION

Figure 1A:
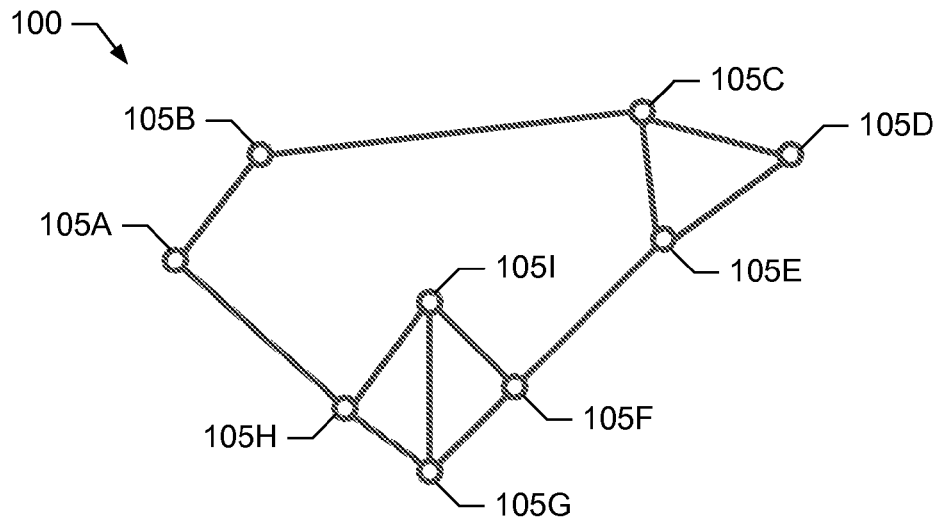
FIGS. 1A-B collectively illustrate an example communication network employing hierarchical routing.

Methods and apparatus for hierarchical routing in communication networks are disclosed herein. An example hierarchical routing method disclosed herein involves determining a plurality of constrained weighted paths, such as a plurality of constrained minimum weight paths, between respective pairs of border nodes of a cluster in a communication network. A border node is a node within a cluster that has at least one link connecting to a node outside of the cluster. As mentioned above, a cluster is a hierarchical grouping (e.g., classification, arrangement, association, etc.) of nodes in a communication network. In some examples, each constrained minimum weight path determined for a cluster is characterized by a respective bandwidth and a respective weight, which allows a constrained minimum weight path for a particular pair of border nodes of the cluster to be selected, based on a bandwidth pruning threshold, from a set of possible paths capable of connecting the particular pair of border nodes. For example, the constrained minimum weight path can be selected to be the possible path having a minimum weight among all possible paths in the set of possible paths having bandwidths that meet or exceed the bandwidth pruning threshold. In some examples, the weight for a path represents a delay and/or a hop count associated with the path. The example method also involves advertising the plurality of constrained minimum weight paths determined for a cluster. For example, a respective bandwidth and a respective weight for each of the constrained minimum weight paths can be advertised for a cluster.

To route a connection through a network, example methods described herein also involve receiving the plurality of constrained minimum weight paths advertised by different clusters in the network, and then determining a minimum weight path through the network for the connection. For example, the minimum weight route through the communication network can include a first constrained minimum weight path from the plurality of constrained minimum weight paths advertised for a cluster, where this first constrained minimum weight path is intended to enable the connection to transit the cluster by entering the cluster at a first (e.g., ingress) border node and then transit across the cluster to a second (e.g., egress) border node. Unless indicated otherwise, terms such as "first," "second," etc., are used herein merely to differentiate between different items and are not meant to indicate any particular relative priority, importance, ordering, etc., of these items. In some examples, when the connection is received at the first border node of the cluster, the connection is routed through the cluster to the second border node via the first constrained minimum weight path if the first constrained minimum weight path is available (e.g., if it has sufficient available bandwidth to carry the connection). However, if the first constrained minimum weight path is unavailable, then the connection is routed through the cluster to the second border node via a different available path having bandwidth sufficient to carry the connection. For example, the connection can be routed through the cluster via a path having a minimum weight among the available paths having bandwidth sufficient to carry the connection.

In prior hierarchical routing techniques, each cluster advertises either minimum weight paths or widest (e.g., largest available bandwidth) paths between each of its border node pairs. As described in greater detail below, these advertising techniques can result in the selection of routes having insufficient bandwidth and/or excessive delay, thereby leading to suboptimal routing. Example methods and apparatus for hierarchical routing disclosed herein can enable improved route selection, at least under some circumstances, by having clusters advertise constrained minimum weight paths, instead of either minimum weight paths or widest paths, for their border node pairs. As noted above, a constrained minimum weight path for a particular border node pair corresponds to the possible path from among the set of possible paths capable of connecting the border node pair that has a minimum weight (e.g., representing a path's delay and/or hop count) from among all possible paths in the set of possible paths whose bandwidth meets or exceeds a bandwidth pruning threshold. Setting of this bandwidth pruning threshold is described in greater detail below.

Figure 1B:
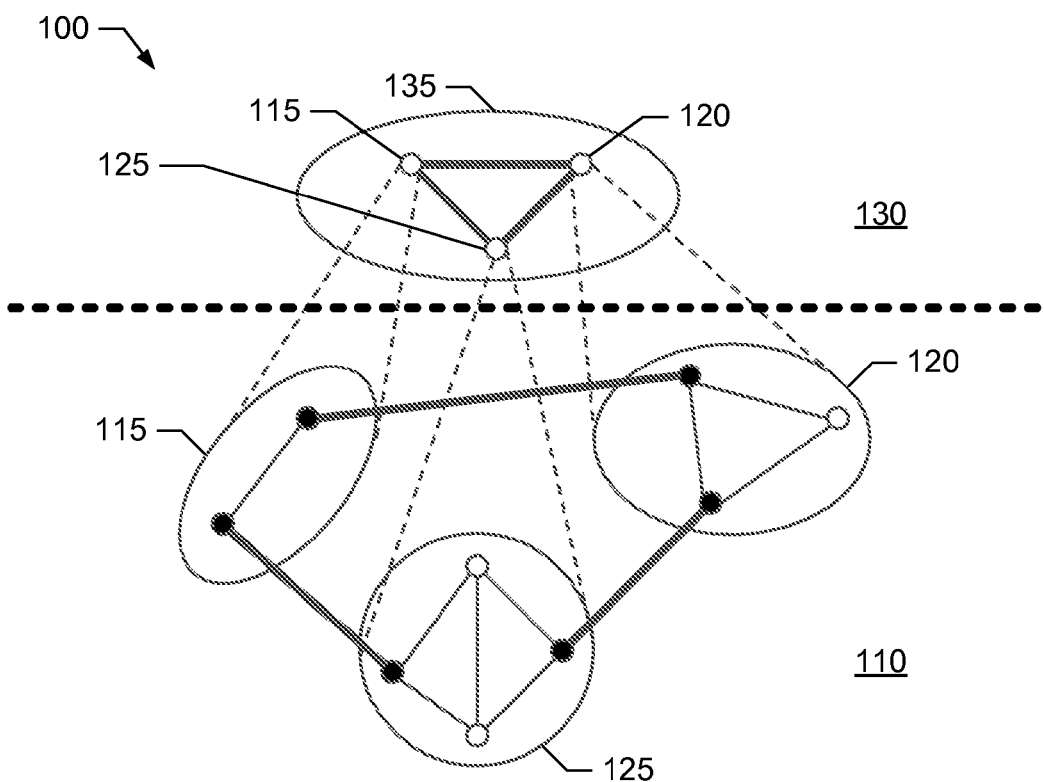

Turning to the figures, block diagrams of an example communication network 100 employing hierarchical routing are illustrated in FIGS. 1A-B. Hierarchical routing is used in many large networks to enable routing to scale efficiently in size and/or to conceal proprietary topology information. In a non-hierarchical (e.g., flat) network, such as in the example network 100 as illustrated in FIG. 1A (e.g., which illustrates the network 100 prior to employing hierarchical routing), the network topology databases in all nodes, such as the example nodes 105A-I, are synchronized to enable efficient and optimizable routing. However, in some examples, a flat network can scale poorly. By using topology aggregation, such as the aggregation of the network 100 as illustrated in FIG. 1B, a multi-level hierarchical network can scale to larger sizes. However, in some examples, a trade-off for such scalability can be route optimization.

FIG. 1B illustrates topology aggregation to enable hierarchical routing in the example network 100. As mentioned above, in hierarchical routing the nodes of a network are grouped (e.g., classified) into different clusters. For example, as shown in FIG. 1B, at a first level 110 of the hierarchy, the nodes 105A-B are grouped into an example cluster 115, the nodes 105C-E are grouped into a second example cluster 120, and the nodes 105F-I are grouped into a third example cluster 125. At a second higher level 130 of the hierarchy, the clusters 115-125 are grouped into higher-level clusters, such as the illustrated example cluster 135, and this process iterates recursively. Finally, at the highest level (e.g., the level 130), there is only a single, top-level cluster (e.g., the cluster 135) for the network 100.

Instead of forming node-based clusters as shown in FIGS. 1A-B, it is also possible to group links instead of nodes to form link-based clusters. Although the example methods and apparatus described herein can be used with either node-based or link-based clusters, the remainder of this disclosure focuses on node-based clustering as described above.

In the illustrated examples of FIGS. 1A-B, at the lowest level, such as the level 110 of FIG. 1B, each node corresponds to a physical node implemented by, for example, a switching system or a router in the network 100. Each cluster 115-125 is represented by a single logical node at the next higher level 130, as shown in FIG. 1B. Furthermore, within a cluster, each physical or logical node forming the cluster maintains in its network topology database the topology and detailed state information about the links and other nodes in the same cluster. However, a cluster advertises externally to other nodes/clusters only a summary, or an aggregated view, of its internal structure. For example, and as described in greater detail below, a cluster can advertise the transit QoS characteristics (e.g., in the form of state parameters, such as weights and available bandwidths) for a set of constrained minimum weight paths connecting the set of border node pairs of the cluster as the aggregated, or summary, topology description for the cluster. This ability to use a single logical node to represent a cluster of connected nodes limits the number of topological elements (i.e., either a link or a node) generating updates on their states and, thus, can significantly improve scalability in at least some scenarios.

Figure 2:
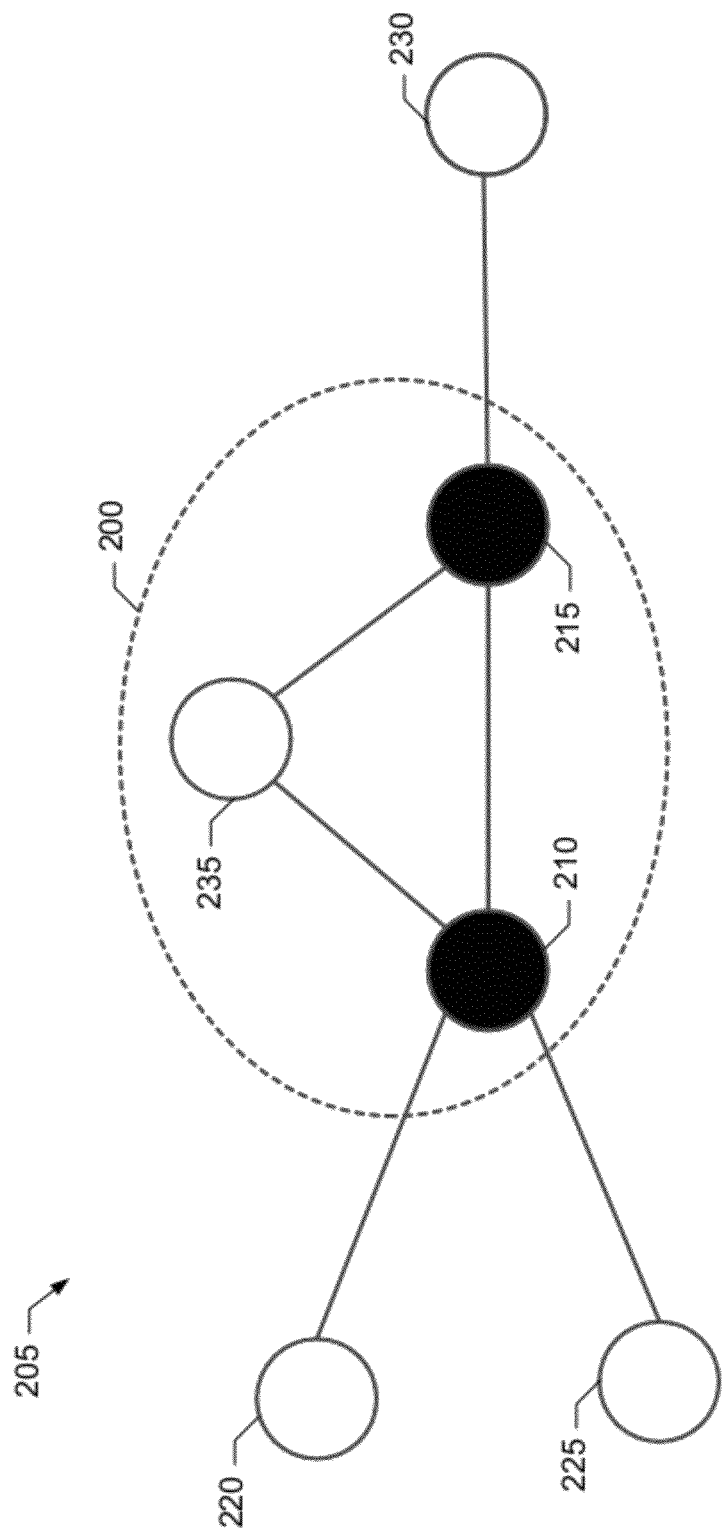
FIG. 2 illustrates an example cluster in an example communication network.

FIG. 2 illustrates an example cluster 200 in an example communication network 205. As described above, the cluster 200 can be viewed as a single logical node. The nodes 220, 225 and 230 can be either physical nodes, or logical nodes representing clusters. The cluster 200 includes a pair of border nodes 210-215 capable of connecting with (e.g., by linking or communicatively coupling to) other nodes or clusters 220, 225 and 230 external to the cluster 200, as shown. The cluster 200 also includes an interior node 235, which has no links to the outside. The interior node 235, the border nodes 210-215, and their internal interconnecting links form the internal topology of the cluster 200. As described in greater detail below, hierarchical routing in the network 205 enables the external nodes or clusters 220, 225 and 230 to view the border nodes 210-215 and learn that there is an internal path connecting the border nodes 210-215 with respective transit QoS characteristics. However, the external nodes or clusters 220, 225 and 230 are unable to view the interior node 235 and are usually unaware of the existence of the interior node 235 and its links to other nodes within the cluster.

For example, to aid routing across the cluster 200, the cluster 200 advertises an aggregated, or summary, topology description conveying the transit QoS characteristics from each ingress (e.g., entry) border node (e.g., such as one of the border nodes 210-215) to each egress (e.g., exit) border node (e.g., such as the other one of the border nodes 210-215) of the cluster 200. For example, without revealing its internal structure, the cluster 200 can advertise to the other clusters or nodes 220-230 its transit QoS characteristics in terms of the state parameters of selected internal paths connecting each pair of border nodes of the cluster 200, as described in greater detail below. Given a cluster, such as the cluster 200, the resulting state parameters associated with this full mesh of border nodes (i.e., the set of selected internal paths between each border node pair) then become the node state parameters of the cluster. For example, a cluster can advertise its node state parameters as the aggregated, or summary, topology description of its internal structure.

Figure 3A:
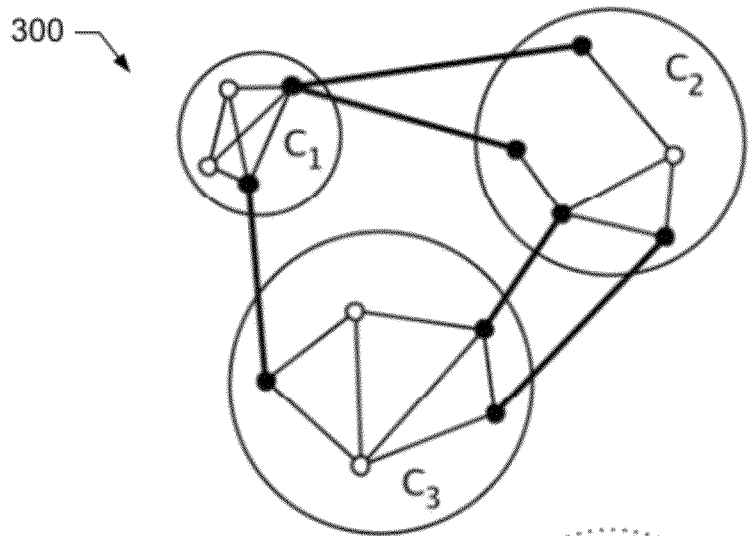
FIGS. 3A-C collectively illustrate an example hierarchical routing operation in an example communication network.
Figure 3B:
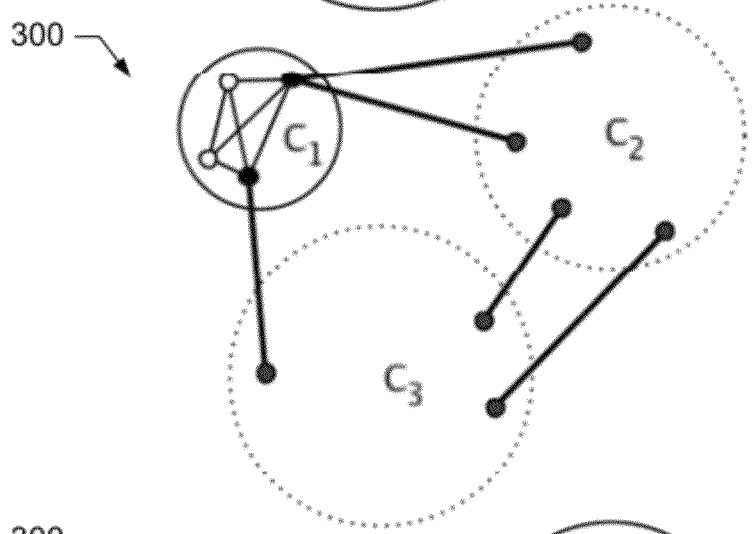
Figure 3C:
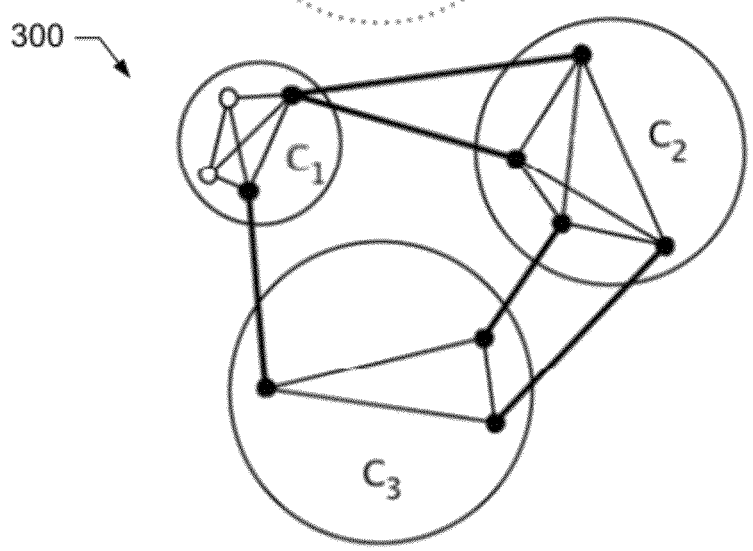

FIGS. 3A-C collectively illustrate an example hierarchical routing operation in an example communication network 300. The hierarchical routing operation is illustrated from the perspective of an example cluster C1 in the network 300. FIG. 3A illustrates the physical topology of the network 300. As shown in FIG. 3A, the nodes in the network 300 are grouped into three clusters labeled C1, C2 and C3. Each cluster has a set of border nodes represented by solid circles, and a set of interior nodes represented by hollow circles.

Next, as shown in FIG. 3B, each node in the cluster C1 has knowledge of its own internal topology and is able to view the border nodes of each other cluster C2 and C3, as well as the external links connecting with these border nodes. However, a node in the cluster C1 is not able to view the interior nodes of the other clusters C2 and C3. Thus, in FIG. 3B, the interior nodes of the clusters C2 and C3 are omitted to illustrate that these interior nodes are not viewable and are unknown to the nodes in the cluster C1.

As described above, each of the clusters C1-C3 advertises an aggregated topology description providing transit QoS characteristics in terms of the node state parameters of the cluster. As shown in FIG. 3C, from the perspective of cluster C1, the advertised aggregated topology description for cluster C2 has the appearance of a full mesh of logical paths connecting the border node pairs of the cluster C2, with each path being characterized by its respective advertised QoS characteristics. Similarly, from the perspective of cluster C1, the advertised aggregated topology description for cluster C3 has the appearance of a full mesh of logical paths connecting the border node pairs of the cluster C3, with each path being characterized by its respective advertised QoS characteristics.

State parameters are now described in more detail. Generally, to support QoS-based routing in a communication network, state parameters describing the characteristics of links and nodes are advertised. These state parameters can be classified as either metrics or attributes. A metric, such as delay, is a state parameter whose effect is cumulative along a path. That is, the values of the metrics of all links and nodes along a given path are combined to determine whether the path meets a connection's QoS requirements. By contrast an attribute, such as bandwidth, is considered individually to determine whether a given link or node meets user requirements. Thus, if the attribute value associated with a particular topological element (such as a link or a node) along a path violates the connection's QoS requirements, that element is eliminated by the routing path selection process.

The following examples of hierarchical routing employ three state parameters: delay, hop count and available bandwidth. However, the example methods and apparatus disclosed herein are not limited thereto and, instead, can utilize any type(s) of state parameter(s) for characterizing QoS associated with paths, links and nodes. Furthermore, in the hierarchical routing examples described herein, state parameters associated with the internal topology of a cluster are used to determine the transit QoS characteristics advertised for the cluster. For convenience, the physical nodes of a cluster are assumed to have zero delays and infinite bandwidth, but such an assumption is not necessary.

Both delay and hop count are additive metrics, which are combined into a single mixed metric, referred to as a weight, as follows. For example, each link is assigned a weight that is the sum of two components: (1) a one-way light-load delay over the link, d; and (2) a penalty for the link, p. The delay, d, is the propagation delay of the link, assuming negligible insertion, processing, and queuing delays, under the use of high-speed links and fast nodal processors. Generally, different links have different values of delay, d. The penalty, p, is a fixed value for all links. The weight, W, of a link L is then $W(L)=d+p$.

In some examples, a routing objective is to minimize a path cost (also referred to as a path weight) subject to this weight function, W(L), for link traversal. The weight (or cost) of a path, P, is defined as the sum of the weights of all links along the path, and can be computed as $W(P)=D+hp$, where $D=\Sigma d$ is the path delay, which is the sum of the different delays d of all links along the path, and h is the hop count of path P. The relative magnitudes of d and p determine the importance attached to either delay or hop count in finding a path. For example, for delay-based routing, a small value is chosen for p.

An example routing objective is to determine a minimum weight path for routing a connection from a source node to a destination node. Let $\{P_k|k=1,\ldots n\}$ be the set of paths for a given source-destination node pair with respective weights $W(P_k)$. A path in this set has minimum weight if the weights of all other paths in the set are at least as much. In some examples, minimum weight path routing enables the selection of paths with low delay and few hops.

Another example routing objective is to determine a widest path or, in other words, a path having the most available bandwidth for carrying a connection. In some examples, to support different traffic classes for different classes of service, a certain amount of bandwidth on a link is allocated to a specific traffic class. This is referred to as the maximum bandwidth for the class. For a given class, the available bandwidth of a link is the residual bandwidth (out of the maximum for the class) on the link that is available for new traffic from the class. Extended over a path from a source node to a destination node, the available bandwidth of a path for a given class is the minimum of the available bandwidth of all links on the path for the class. In other words, the available bandwidth for a path is also the bottleneck bandwidth for the path.

Let B( ) denotes the available bandwidth for a class. If the path $P_k$ between a source-destination pair has links $\{L_j|j=1,\ldots,m_k\}$, then the available (or bottleneck) bandwidth for the path is $B(P_k)=\min B(L_j)$. The path in the set $\{P_k\}$ that has the maximum available (or bottleneck) bandwidth, i.e., max $B(P_k)$, is referred to as a widest path for the given source-destination pair. Widest path routing generally finds a path with the most available bandwidth, regardless of the number of hops traversed. In some examples, when there are multiple widest paths, tie breaking is performed by selecting the widest path with the smallest weight.

Figure 4A:
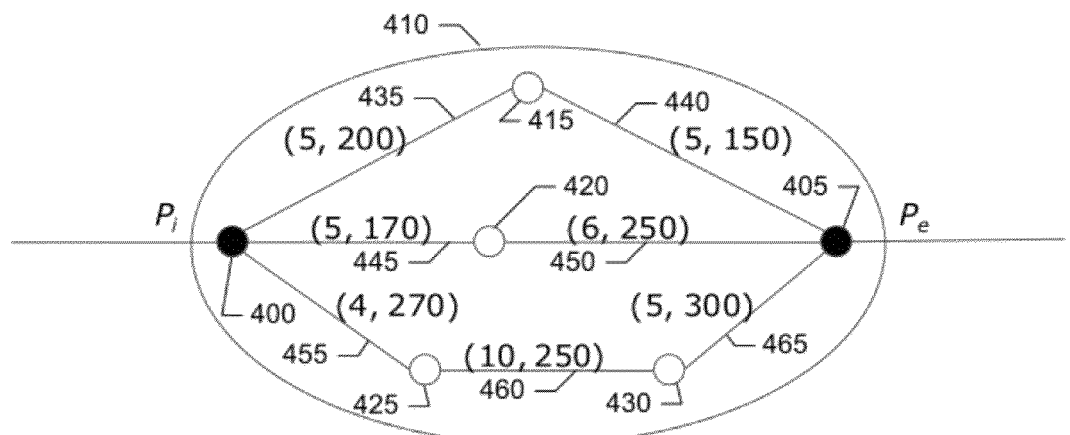
FIGS. 4A-B illustrate examples of determining quality of service (QoS) characteristics for a path between a pair of example border nodes in an example cluster.
Figure 4B:
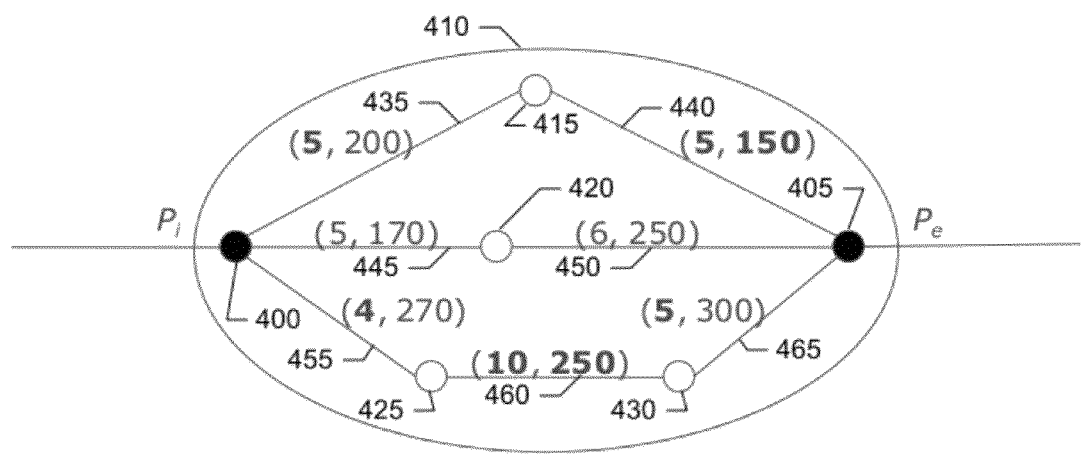

Based on the foregoing, for a given node pair, the QoS characteristics of a path for a class can be captured by a pair of state parameters given by: (path weight, available bandwidth of the path for the class). FIGS. 4A-B illustrate examples of determining the QoS characteristics for a path between a pair of example border nodes 400 and 405 in an example cluster 410. For example, FIG. 4A illustrates pairs of (link weight, link available bandwidth) state parameters for each link connecting each pair of nodes in the example cluster 410, assuming a single traffic class. The cluster 410 includes the two border nodes 400 and 405, four interior nodes, 415-430, and seven links 435-465 interconnecting combinations of the border nodes 400-405 and interior nodes 415-430. In the illustrated example, there are three internal paths between the border nodes 400-405. The upper path comprises the links 435-440 and the interior node 415. The middle path comprises the links 445-450 and the interior node 420. The lower path comprises the links 455-465, and the interior nodes 425-430. Each of these three paths is associated with a pair of (path weight, path available bandwidth) state parameters.

When there are multiple QoS characteristics, it may not be possible to select a single path that simultaneously optimizes all of the state parameters. For example, given a source-destination pair, a minimum weight path has the smallest weight among all the paths but not necessarily the most available bandwidth. As another example, a widest path has the most available bandwidth, but may be more circuitous (e.g., the widest path may have more delay and/or hops) than a minimum weight path. This is because paths with smaller weights tend to get filled up first by virtue of the tie-breaking rule, thereby leaving these paths with lower available bandwidth. For example, FIG. 4B illustrates the minimum weight path and the widest path connecting the border nodes 400-405. In the illustrated example, the minimum weight path connecting the border nodes 400-405 is the upper path containing links 435 and 440, because the overall weight for this path is 5+5=10 (corresponding to the sum of the boldface weights along this path), which is the minimum weight among all possible paths connecting the border nodes 400-405. By contrast, the widest path connecting the border nodes 400-405 is the lower path containing links 455, 460 and 465, because the bottleneck bandwidth for this path is 250 (corresponding to the boldface available bandwidth along this path), which is the largest bottleneck bandwidth among all possible paths connecting the border nodes 400-405. As expected, the minimum weight path has a smaller bottleneck bandwidth (e.g., 150, which is written in boldface) than the widest path, and the widest path is more circuitous (e.g., has more hops) than the minimum weight path. As explained in greater detail below, the example methods and apparatus for hierarchical routing described herein cause state parameters for constrained minimum weight paths, as compared to minimum weight paths or widest paths, between border node pairs to be advertised by the clusters in a network.

Figure 5:
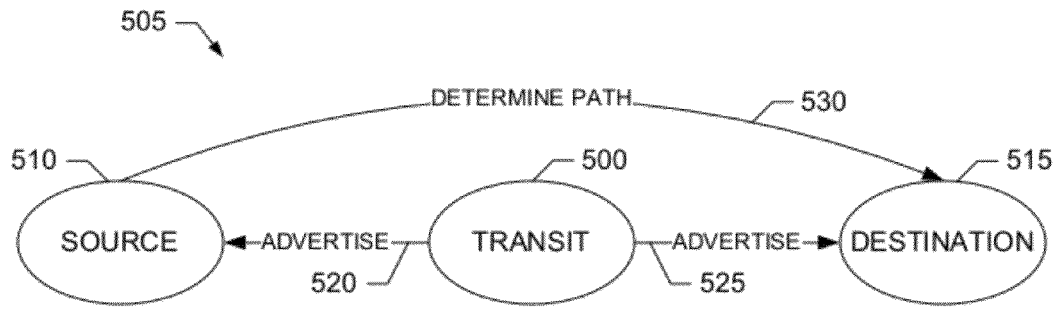
FIG. 5 illustrates an example of utilizing an aggregated topology description advertised by an example cluster for hierarchical routing in an example communication network.

At each node in a cluster, the sets of node state parameters received from other clusters enable the node (i.e., the source node) to decide which cluster(s) to use for transit in routing a connection to a destination, as well as to select an appropriate ingress border node to a transit cluster and the appropriate associated egress border node from the transit cluster. The list of transit clusters selected, together with the corresponding ingress and egress border node pair selected for each transit cluster, are recorded by the source node as routing path information in the connection. An example of such routing by a source 510 utilizing an aggregated topology description advertised by an example cluster 500 for hierarchical routing in an example communication network 505 is illustrated in FIG. 5. In the illustrated example, the cluster 500 advertises its aggregated topology description (e.g., in the form of the node state parameters of the cluster 500) to other external nodes and clusters, each such as the clusters 510 and 515, in the network 505. (In FIG. 5, this advertisement is represented by directed lines 520 and 525). To establish a connection between the source cluster 510 and the destination cluster 515, the source cluster 510 (or a source node originating the connection in the source cluster 510) evaluates the aggregated topology description received by the cluster 500 (represented by the directed line 520 for the cluster 500) to determine a path (represented by a directed line 530) for routing the connection from the source cluster 510 (or a source node originating the connection in the source cluster 510) to the destination cluster 515 (or a destination node terminating the connection in the destination cluster 510). For example, the cluster 510 can use the received aggregated topology description for the cluster 500 to select an ingress-egress border node pair for transiting the cluster 500.

Because the state of the network 505 changes over time, the cluster 500 advertises changes in its node state parameters so that the old values maintained in various external nodes/clusters can be updated accordingly. For example, available bandwidth is a dynamic attribute that varies according to the level of traffic traversing a link and the resulting residual link capacity available for additional traffic. In connection-oriented networks, available bandwidth is required to arbitrate whether a given link is suitable to carry a new connection. This arbitration is typically performed by a connection admission control mechanism.

When parameters frequently change, there is the potential for a network to be overwhelmed by the advertisements of updates. To reduce communication overhead, a dampening mechanism is employed in the network 505 to reduce update frequency by limiting advertisements below a set threshold. For example, changes in available bandwidth can be measured in terms of a proportional difference from the last value advertised and are advertised only if they are significant. To avoid the possibility of long periods characterized by only small changes that do not trigger updates, in some examples a timer-based mechanism for triggering parameter advertisements is additionally used.

While bandwidth information is rather dynamic, link weights are relatively static. Link weight changes are usually driven by link status changes. For example, maintenance or failure of a link generally causes its weight to be set to a large value. When installing a new link, there is usually a soak-in period for line quality monitoring during which the link weight is set to a large value to discourage traffic from using the link. Such weight assignment is referred to as cost-out weight. The cost-out weight is typically chosen to be several times larger than the weight of the expected longest path in the entire network. When the link is ready for service, it is then assigned its normal delay-based weight, which is also referred to as the cost-in weight. The cost-out weight can also be used to prepare a link for removal from service to discourage new connections from utilizing the link As a result of these operational practices, in some examples dampening is not applied to link weights because any change is considered to be significant.

In some examples, the source cluster 510 determines paths for connections on demand based on the QoS requirements specified by an application requesting a connection. Each request initiates an instance of a process responsible for path computation. When connection requests are frequent, it is possible for a network to be overloaded with such activities. As such, additionally or alternatively source cluster 510 can compute paths in the background based on the state parameters received prior to connection establishment time. Recomputation of these pre-computed paths is then triggered when advertisements of significant changes are received from other nodes. Pre-computed paths to different destinations are recorded by source cluster 510 in a connection routing table. When a connection request arrives, source cluster 510 simply consults this table for a path, rather than initiating a path computation process.

Due to time delays in updates, the actual state of the network 505 can drift away from the last advertised values maintained by different nodes. Thus, it is possible for a connection to arrive at the cluster 500 only to find out that its available bandwidth has been depleted to the extent that the bandwidth requirement of the connection can no longer be met. In such an example, the blocked connection has to be rolled back (also referred to as a crankback) to try an alternative path toward the final destination, resulting in an increased setup time for the connection, as well as a possible lower overall connection throughput.

Figure 6:
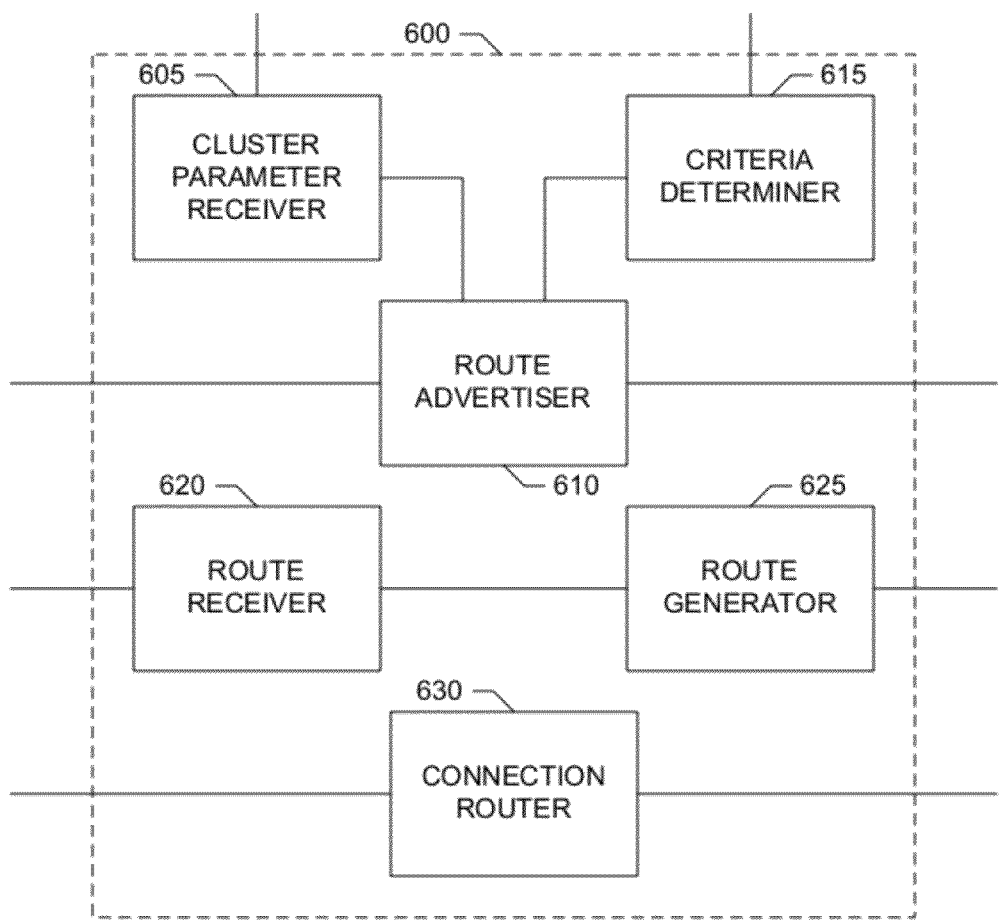
FIG. 6 illustrates an example hierarchical routing processor that can be used to implement hierarchical routing employing constrained minimum weight paths in accordance with the examples described herein.

A block diagram of an example hierarchical routing processor 600 that can be used to implement hierarchical routing in accordance with the examples described herein is illustrated in FIG. 6. The hierarchical routing processor 600, or at least one or more portions thereof, can be implemented in one or more nodes of a cluster to determine and advertise an aggregated topology description including the QoS state parameters describing the paths selected for connecting each border node pair of the cluster (e.g., such as the constrained minimum weight paths selected for connecting each border node pair, as described in greater detail below). As such, the hierarchical routing processor 600 includes an example cluster parameter receiver 605 to receive the state parameters (e.g., the weights and available bandwidths as described above) for the internal links connecting the interior and border nodes of the cluster. The received information updates the network topology database and is stored therein. An example route advertiser 610 included in the hierarchical routing processor 600 makes use of the network topology database updated by the cluster parameter receiver 605 to determine the sets of possible paths connecting each pair of border nodes in the cluster, and to determine the QoS state parameters for each of the possible paths. Using criteria, such as a bandwidth pruning threshold, determined by an example criteria determiner 615 included in the hierarchical routing processor 600, the route advertiser 610 selects and advertises the state parameters of a particular path (e.g., such as a constrained minimum weight path described in greater detail below) for connecting each pair of border nodes. The implementation and operation of the cluster parameter receiver 605, the route advertiser 610 and the criteria determiner 615 are described in further detail below in connection with the remaining figures.

Additionally, the hierarchical routing processor 600, or at least one or more portions thereof, can be implemented in one or more nodes of a cluster to receive advertised routing information (e.g., such as aggregated topology descriptions) from other clusters and/or nodes and to use the received routing information to determine paths for routing connections through a network from a source to a destination as specified by a connection request. For example, the hierarchical routing processor 600 includes an example route receiver 620 to receive routing information in the form of node state parameters advertised by different clusters. The hierarchical routing processor 600 also includes an example route generator 625 to use the received routing information to generate a route (or, in other words, a path) through the network towards a destination for a connection request. The implementation and operation of the route receiver 620 and the route generator 625 are described in further detail below in connection with the remaining figures.

Furthermore, the hierarchical routing processor 600, or at least one or more portions thereof, can be implemented in one or more nodes of a cluster (such as the cluster's border nodes) to route a connection received at a particular ingress border node of the cluster to a particular egress border node of the cluster. For example, the hierarchical routing processor 600 includes an example connection router 630 to detect reception of a connection request at an ingress border node, process the connection request to determine the egress border node to which the connection is to be routed, and to determine an appropriate transit path through the cluster to carry the connection from the ingress border node to the egress border node. The implementation and operation of the connection router 630 are described in further detail below in connection with the remaining figures.

In some examples, the hierarchical routing processor 600, or at least one or more portions thereof, is implemented by one or more processing elements, such as a cluster controller, separate from the nodes implementing a particular cluster. Additionally or alternatively, one or more portions of the hierarchical routing processor 600 can be implemented by one or more tools separate from any cluster. An example of such a tool is described in greater detail below.

While an example manner of implementing the hierarchical routing processor 600 has been illustrated in FIG. 6, one or more of the elements, processes and/or devices illustrated in FIG. 6 may be combined, divided, re-arranged, omitted, eliminated and/or implemented in any other way. Further, the example cluster parameter receiver 605, the example route advertiser 610, the example criteria determiner 615, the example route receiver 620, the example route generator 625, the example connection router 630 and/or, more generally, the example hierarchical routing processor 600 of FIG. 6 may be implemented by hardware, software, firmware and/or any combination of hardware, software and/or firmware. Thus, for example, any of the example cluster parameter receiver 605, the example route advertiser 610, the example criteria determiner 615, the example route receiver 620, the example route generator 625, the example connection router 630 and/or, more generally, the example hierarchical routing processor 600 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example hierarchical routing processor 600, the example cluster parameter receiver 605, the example route advertiser 610, the example criteria determiner 615, the example route receiver 620, the example route generator 625 and/or the example connection router 630 are hereby expressly defined to include a tangible computer readable medium such as a memory, digital versatile disk (DVD), compact disk (CD), etc., storing such software and/or firmware. Further still, the example hierarchical routing processor 600 of FIG. 6 may include one or more elements, processes and/or devices in addition to, or instead of, those illustrated in FIG. 6, and/or may include more than one of any or all of the illustrated elements, processes and devices.

To understand the potential benefits of the constrained minimum weight paths determined, as described in greater detail below, by the hierarchical routing processor 600, it can be helpful to examine some potential drawback of advertising aggregated cluster topologies based on minimum weight paths and widest paths. For example, suppose that a source node/cluster in a network computes minimum weight paths to different destinations. Further, suppose that each cluster in the network advertises aggregate topologies in the form of QoS state parameters for the minimum weight paths connecting the cluster's border node pairs. Receipt of the minimum weight paths (e.g., including the transit weights and available bandwidths for these minimum weight paths) advertised by different clusters enables a source node to select a concatenated path of transit clusters to a destination node/cluster that has low latency and few hops. However, in at least some scenarios, links or nodes with small weights tend to attract traffic. As a result, a cluster that advertises small transit weights relative to other clusters can encourage traffic to go through it, thereby consuming its available bandwidth. Therefore, the available bandwidth associated with the minimum weight paths advertised by a cluster under this scheme may be low. As such, a cluster advertising minimum weight paths may not be chosen by a source node for routing a connection if the bandwidth required by the connection exceeds what is advertised by the cluster, even though there may actually be other, non-minimum weight paths in the cluster having larger weights but sufficient available bandwidth to carry the connection through the cluster.

Figure 7:
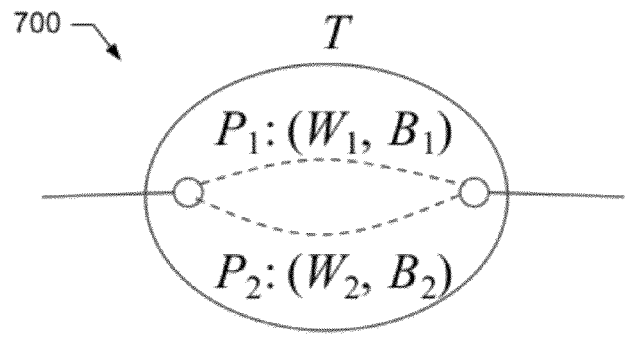
FIG. 7 illustrates an example network in which an example cluster advertises minimum weight paths.

For example, FIG. 7 illustrates an example network 700 in which an example cluster T advertises minimum weight paths. In the illustrated example, there are two example paths $P_1$ and $P_2$ between the same border node pair in the cluster T having state parameters $(W_1, B_1)$ and $(W_2, B_2)$, respectively, where $W_i$ represents the weight of path $P_i$, and $B_i$ represents the available bandwidth of $P_i$. If $W_1 < W_2$, then $P_1$ is the minimum weight path and $(W_1, B_1)$ is advertised as the transit QoS characteristics of the cluster T. If the bandwidth requirement $B_c$ of a connection is such that $B_1 < B_c \leq B_2$, then this connection will not transit the cluster T because the cluster T is deemed to have insufficient bandwidth, even though sufficient bandwidth does exist on $P_2$.

In examples where clusters advertise the widest paths between border node pairs, a cluster selects those links with more bandwidth available for subsequent connections, thereby minimizing the probability of blocking In some examples, widest paths tend to have more hops and larger weights. The advertisement of these large transit weights by a cluster can tend to discourage transit through it. This may result in non-optimal routing with the selection of longer paths through other clusters, as illustrated by the following example.

Figure 8:
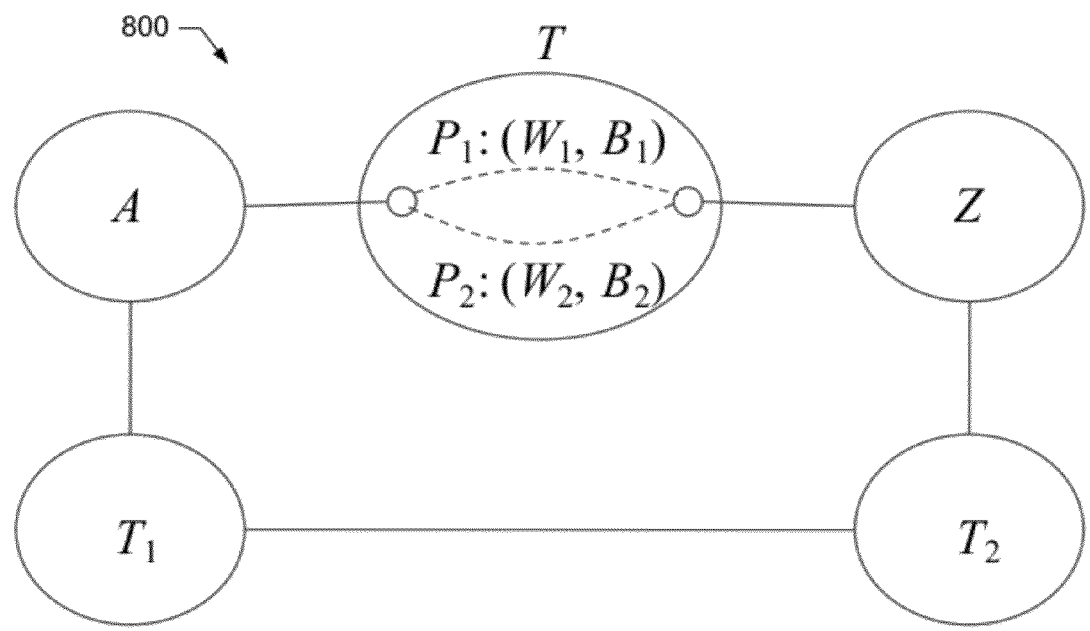
FIG. 8 illustrates an example network in which an example cluster advertises widest paths.

For example, FIG. 8 illustrates a network 800 with an example source cluster A, an example destination cluster Z, and three example transit clusters T, $T_1$, and $T_2$. In the illustrated example, there are two example paths $P_1$ and $P_2$ between the same border node pair in the cluster T having state parameters ($W_1$, $B_1$) and ($W_2$, $B_2$), respectively, where $W_i$ represents the weight of path $P_i$, and $B_i$ represents the available bandwidth of $P_i$. If $P_1$ is the widest path in cluster T and has an available bandwidth of $B_1 > B_2$, then ($W_1$, $B_1$) associated with the widest path $P_1$ is advertised as the transit QoS characteristics of the cluster T. In the illustrated example, there are two inter-cluster paths from a source node/cluster A to a destination node/cluster Z: the upper path via cluster T, and the lower path via clusters $T_1$ and $T_2$. If either of these paths meets a connection's bandwidth requirement, and if the upper path has a smaller weight than the lower path, then the upper path will be selected for routing.

Furthermore, inside cluster T, if both of the paths $P_1$ or $P_2$ have sufficient available bandwidth for an incoming connection, in some examples the ingress node in T will select the one having a smaller weight through T for routing the connection through the cluster. In such examples, the actual path selected for a connection to transit a cluster may be different from the widest path advertised by the cluster.

Next, suppose that a new link is installed inside the cluster T somewhere along path $P_2$. During a soak-in period prior to service, this new link is assigned a large weight, as described above, to prevent traffic from being attracted to this link. As a result, all of the bandwidth of the new link may be available. By including this new link as part of $P_2$, this revised path $P_2$ has a much larger weight than $P_1$ (e.g., $W_2 \gg W_1$), which discourages traffic from using path $P_2$. Over time, because traffic has been discouraged from taking the path $P_2$, the path $P_2$ may end up having more available bandwidth than $P_1$ (e.g., $B_2 > B_1$). If this occurs, path $P_2$ will become the widest path and the transit QoS characteristics advertised by the cluster T will change to ($W_2$, $B_2$) associated with the now widest path $P_2$, even though the large weight associated with $P_2$ was intended to discourage connections from using this path. However, the very large weight of $W_2$ may force the source node/cluster A to switch to the lower path through clusters $T_1$ and $T_2$ to the destination node/cluster Z, even though the unadvertised path via $P_1$ had adequate available bandwidth and a smaller weight. Note that if T is not a cluster as in a flat network, the large weight assigned to a new link during soak-in generally achieves its intended effect of discouraging traffic. However, in the illustrated example where T is a cluster, advertising widest paths can have the foregoing undesirable effect of causing a cluster to advertise a path undergoing soak-in as a selected (e.g., widest) path for transiting the cluster.

In the preceding example, after the soak-in period, the new link will be assigned its normal in-service weight. The A-Z traffic would then likely revert back to the upper path via the cluster T.

It appears that a possible way to avoid the above problem of selecting a new link during its soak-in period as part of the widest path is to artificially lower the new link's bandwidth. While this is theoretically possible, it is not practical in a live network. When installing a link, the parameters for the physical characteristics of the link need to be configured properly according to their in-service values so that testing during the soak-in period can be done to assess the link quality. Once the soak-in period terminates with all the quality tests having been passed, the link can be placed in service. Link bandwidth is a physical characteristic that is usually tested to ensure that the link can support its full data rate(s) at specified error rate(s). Thus, in practice, it is not possible to lower the bandwidth of a new link during its soak-in to avoid the problem of selecting a new link during its soak-in period as part of an advertised widest path.

Figure 9A:
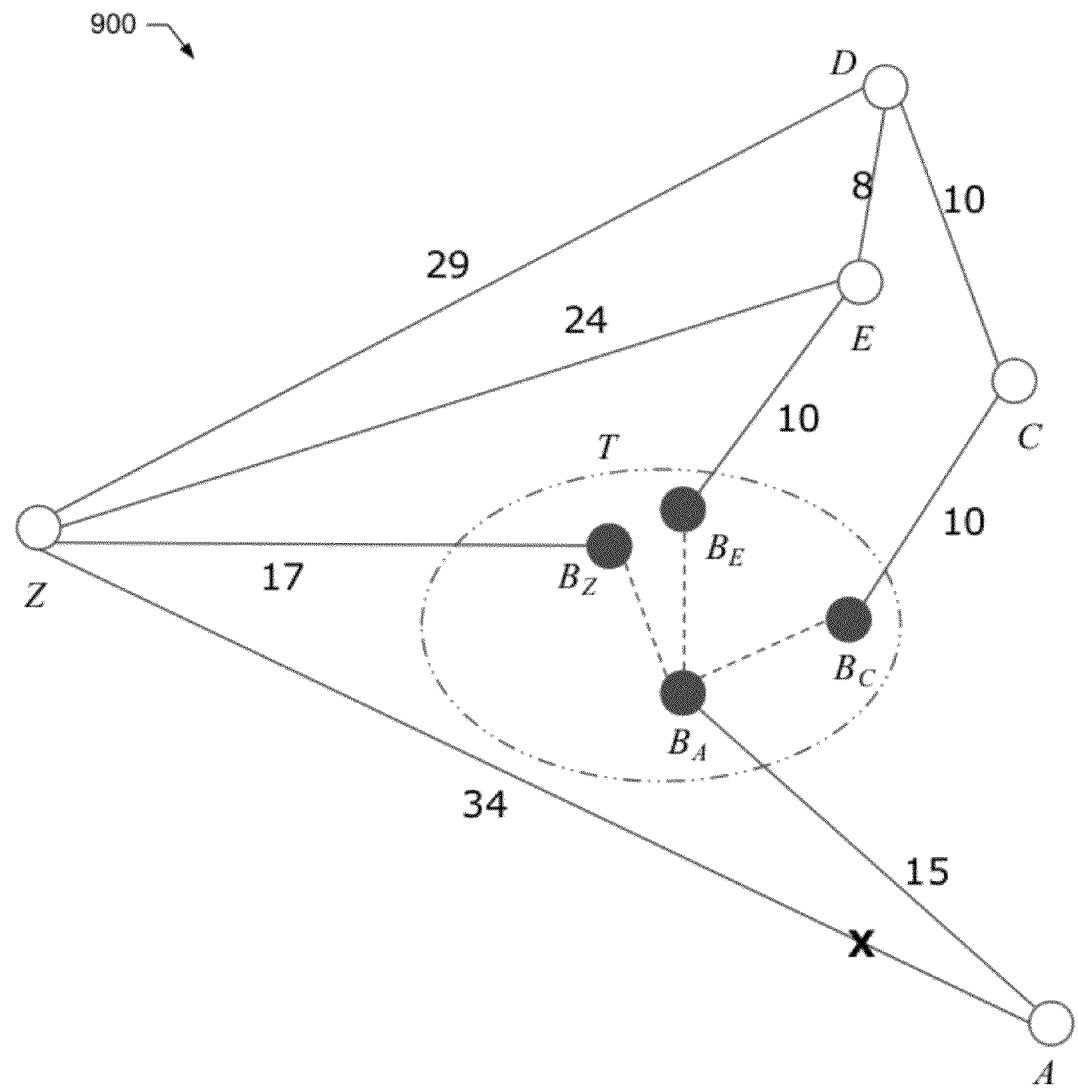
FIGS. 9A-E collectively illustrate failure rerouting in an example network in which an example cluster advertises widest paths.

FIGS. 9A-E collectively illustrate another example network 900 in which an example cluster T advertises widest paths, and the potential pitfalls associated therewith. In particular, FIG. 9A depicts a block diagram of the network 900 in which the links between nodes/clusters are labeled with their respective weights. The network 900 includes an example cluster T and five other nodes/clusters A, C, D, E and Z. In the illustrated example, only the border nodes of the cluster T are shown as solid circles $B_s$, where the subscript s of a border node is either A, C, E and Z to correspond to the exterior node/cluster connected to the respective border node.

In the illustrated example, traffic from source node/cluster A to destination node/cluster Z normally takes the illustrated direct link joining these two nodes/clusters. However, in an example operating scenario, this link failed due to a cable cut incident (which is represented as an "X" being drawn through this link). However, after this cable cut incident, it was noticed that the connections from A to Z were rerouted through T, C, and D, with significant increases in latency. Further analysis was performed to determine why the connections from A to Z were not rerouted through more direct paths, such as via T only, or via T and E.

Figure 9B:
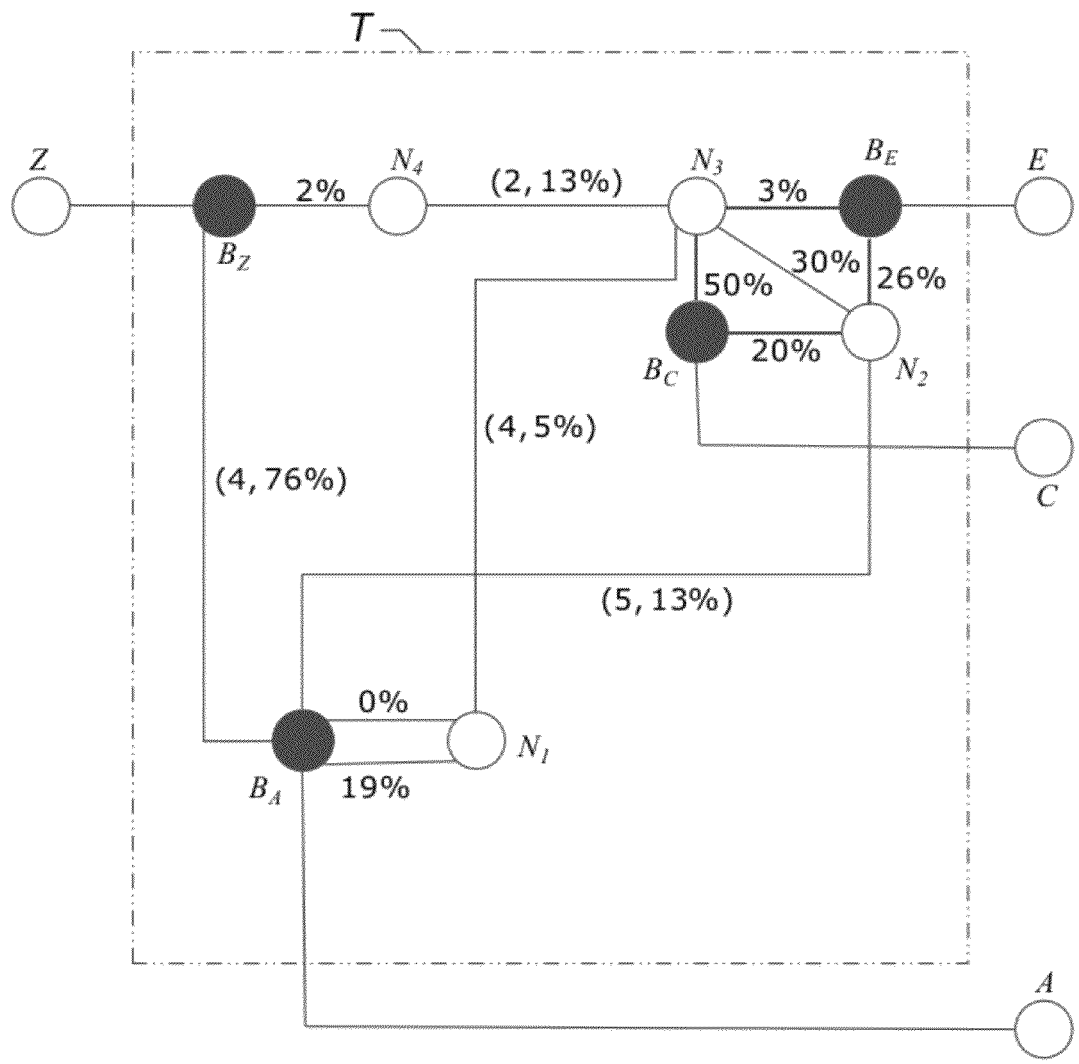

The analysis revealed that this undesirable, indirect routing was caused by cluster T advertising widest paths for its aggregated topology. FIG. 9B illustrates an example internal topology of the cluster T of FIG. 9A. Inside T, the border nodes are again represented by solid circles, and the interior nodes by hollow circles. Each internal link is labeled with a pair of numbers corresponding to the link's weight and the percentage of utilized bandwidth on the link. The percentage of available bandwidth on a link is computed as (100—percentage of utilized bandwidth). In the illustrated example, links having a weight of 1 are labeled with only their percentage of available bandwidth. For simplicity, it is assumed that all links have the same capacity.

Figure 9C:
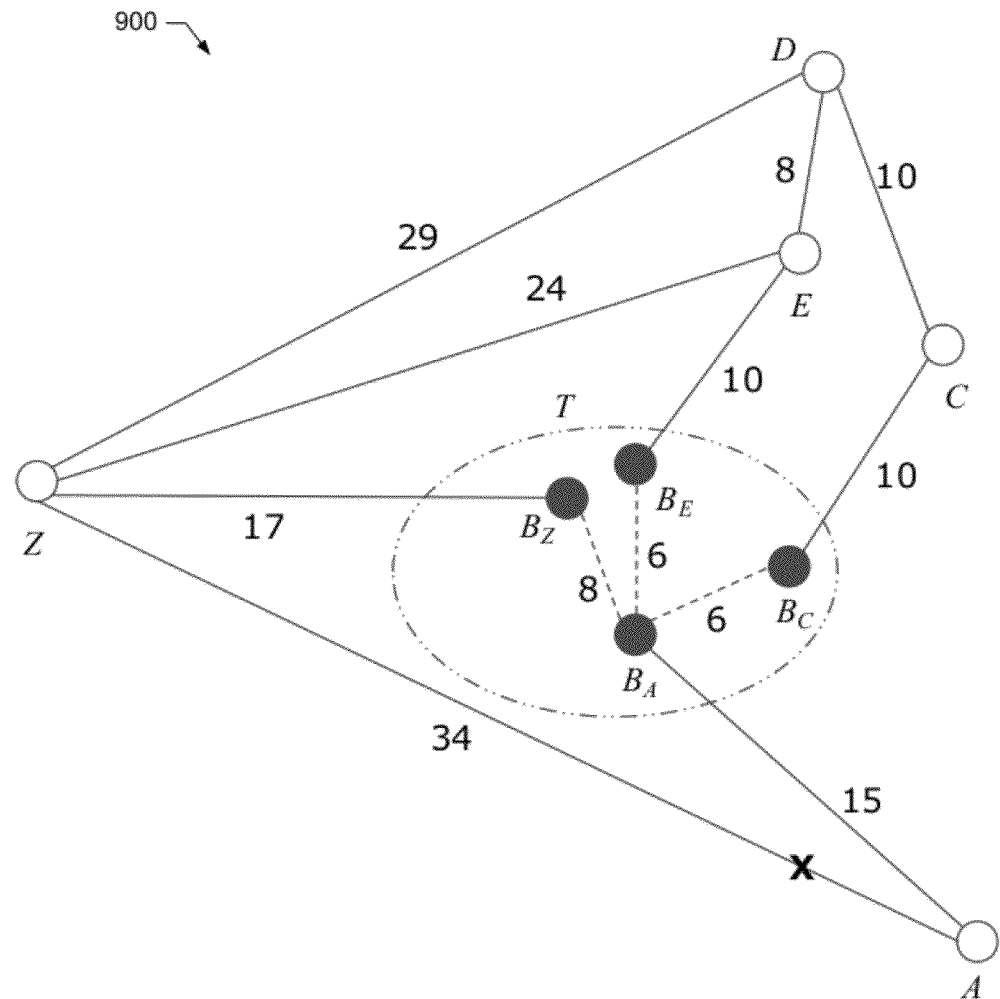

Under normal operation, the widest path between the border node pair $B_A$ and $B_C$ is the path $B_A$ to $N_2$ to $B_C$, which has an associated weight of 5+1=6. Similarly, the widest path between the border node pair $B_A$ and $B_E$ is the path $B_A$ to $N_1$ to $N_3$ to $B_E$, which has an associated weight of 1+4+1=6. Similarly, the widest path between the border node pair $B_A$ and $B_Z$ is the path $B_A$ to $N_1$ to $N_3$ to $N_4$ to $B_Z$, which has an associated weight of 1+4+2+1=8. Accordingly, FIG. 9C illustrates the portion of the aggregated topology advertised by the cluster T that describes the logical paths connecting the border node $B_A$ with the other three border nodes. These logical paths correspond to selection of the foregoing widest paths to connect each pair of border nodes including border node $B_A$ and are labeled by their respective path weights.

With reference to FIG. 9C, generally the node/cluster A determines a route for a connection to be the minimum weight path (with sufficient available bandwidth) to Z. The node/cluster A determines this minimum weight path using the link weights it sees plus any advertised weights for any cluster that the A-Z connections may transit. From the advertised weights of T shown in FIG. 9C, after the direct link from A to Z is cut, the next minimum weight path is the route from A to T to Z, which has a weight of 15+8+17=40. However, as noted above, during network operation it was observed that connections from A to Z were rerouted to go via T, C, and D, instead of being rerouted just through T. The reason for this is illustrated in FIG. 9D.

Figure 9D:
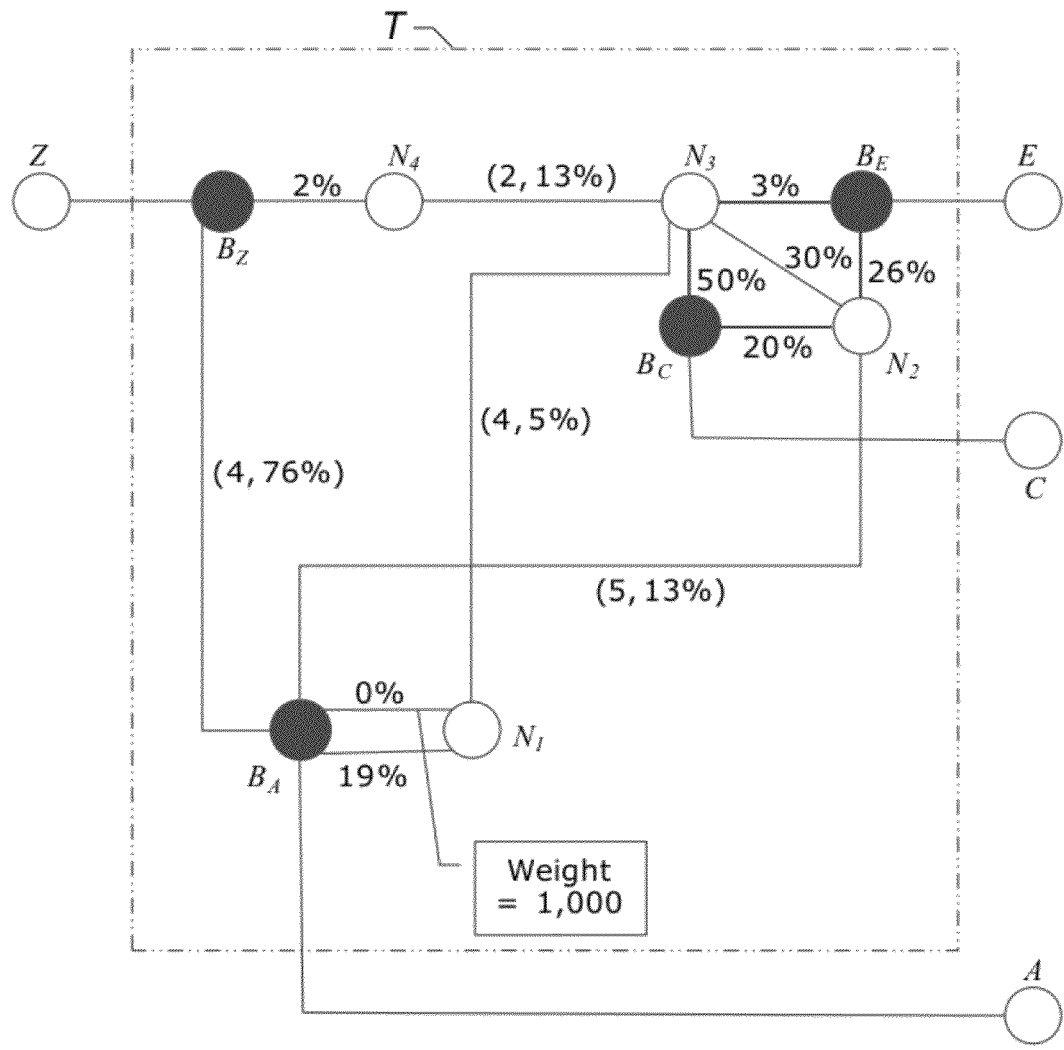
Figure 9E:
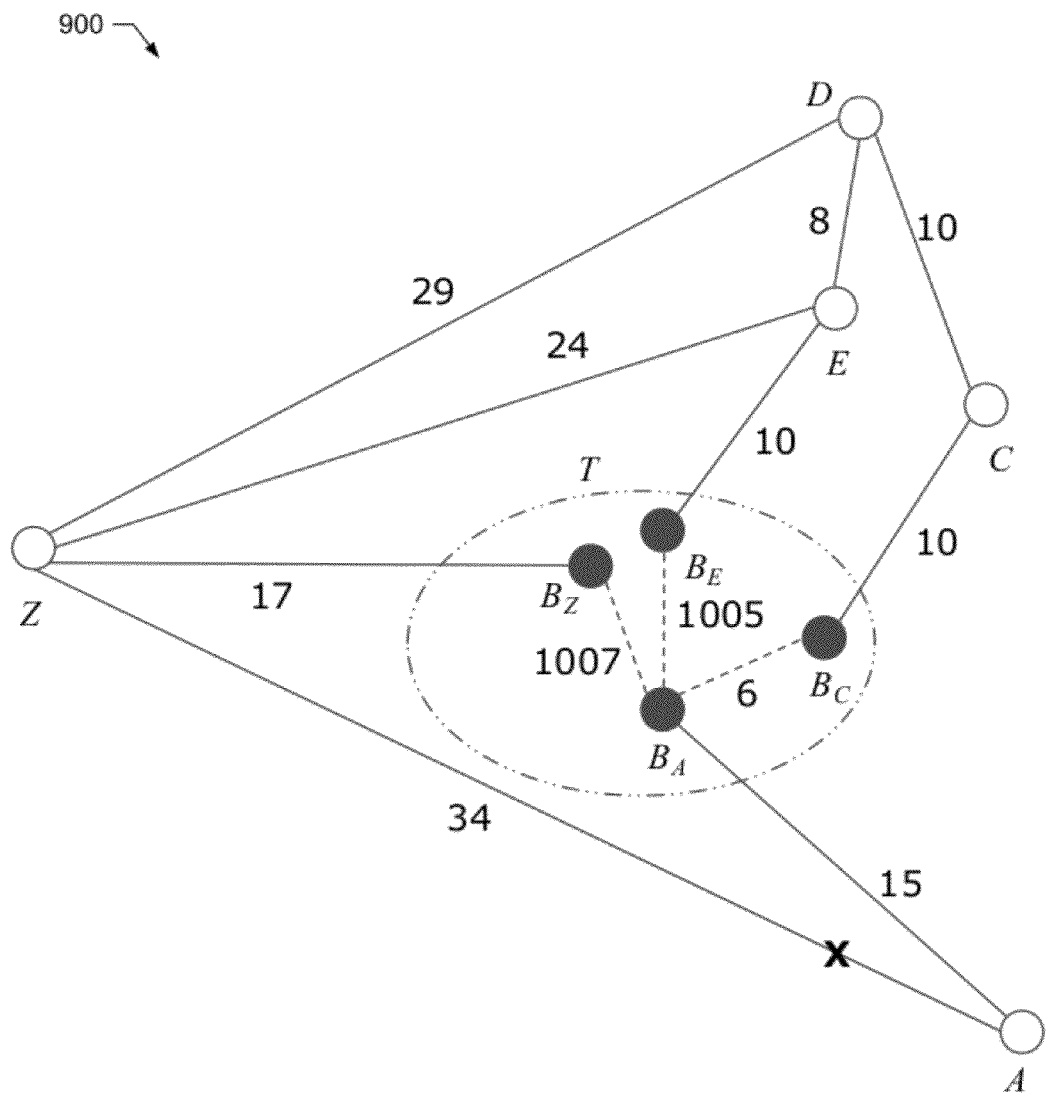

In the illustrated example of FIG. 9D, when the direct link from A to Z was cut, a new parallel link between border node $B_A$ and interior node $N_1$ was undergoing soak-in and was, therefore, assigned a large weight of 1000, as shown. However, this new link had more available bandwidth (e.g., because its percentage of utilized bandwidth is 0% as shown) than the other link between border node $B_A$ and $N_1$. This resulted in the new link being included in the widest path for some of the border node pairs. For example, with reference to FIG. 9D, the widest path between the border node pair $B_A$ and $B_C$ is the path $B_A$ to $N_2$ to $B_C$, which has an associated weight of 5+1=6. Similarly, the widest path between the border node pair $B_A$ and $B_E$ is the path $B_A$ to $N_1$ to $N_3$ to $B_E$, which has an associated weight of 1000+4+1=1005. Similarly, the widest path between the border node pair $B_A$ and $B_Z$ is the path $B_A$ to $N_1$ to $N_3$ to $N_4$ to $B_Z$, which has an associated weight of 1000+4+2+1=1007. Accordingly, FIG. 9E illustrates a portion of the aggregated topology advertised by the cluster T while the new link was undergoing soak-in. The logical paths correspond to selection of the foregoing widest paths to connect each pair of border nodes including border node $B_A$ and are labeled by their respective path weights.

With reference to FIG. 9E, it is readily seen that the large weight associated with the new link undergoing soak-in significantly skews the weights of some of the possible widest paths through cluster T from node/cluster A to node/cluster Z. For example, from the advertised weights of T shown in FIG. 9E, after the direct link from A to Z is cut, the next minimum weight path is the route from A to T to C to D to Z, which has a weight of 15+6+10+10+29=70. Because this widest path (between border node pair $B_A$ and $B_C$ having the longest detour has the smallest weight, node/cluster A selects it to route connections to node/cluster Z, with significant increases in latency as noted above. The other widest paths (between border node pair $B_A$ and $B_E$, and between border node pair $B_A$ and $B_Z$) advertised by cluster T have much larger weights and so are not selected by node/cluster A for rerouting connections from A to Z. Note that, generally, the node/cluster A determines a route for a connection to be the minimum weight path (with sufficient available bandwidth) to Z. The node/cluster A determines this minimum weight path using the link weights it sees plus any advertised weights for any cluster that the A-Z connections may transit.

In view of the foregoing problems associated with clusters advertising minimum weight paths or widest paths, a possible improvement would be to permit clusters to advertise both minimum weight paths and widest paths so that more accurate information can be captured in the node state parameters. However, generation and maintenance of both sets of paths can consume additional processing cycles and additional storage space at some or all of the nodes in a network. Additionally, advertisement of the state parameters for both sets of paths can consume additional bandwidth on all the links over which they are sent.

Figure 10:
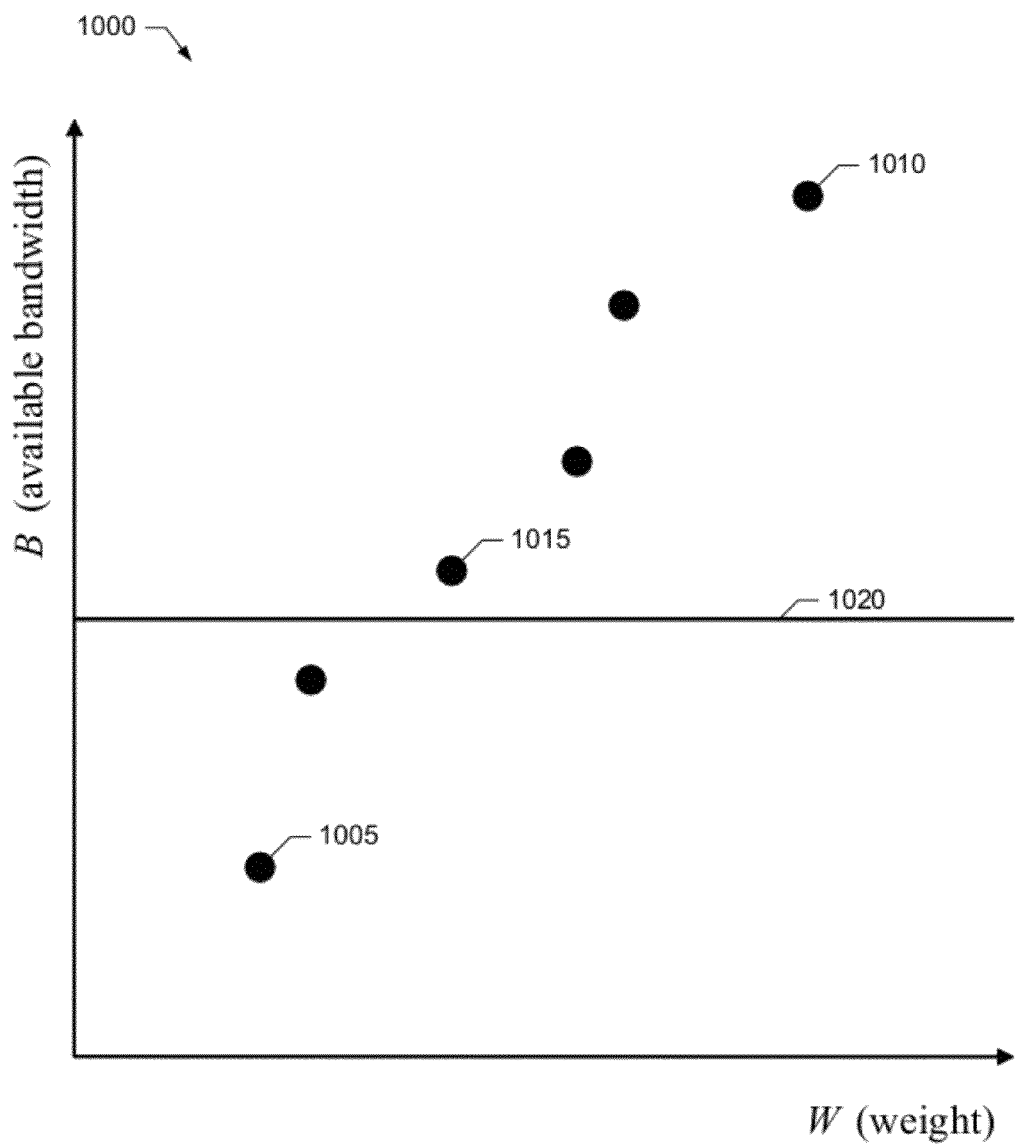
FIG. 10 illustrates the determination of a constrained minimum weight path through a cluster based on an example bandwidth pruning threshold.

Instead of advertising either minimum weight paths or widest paths, or both, for a particular cluster, the hierarchical routing processor 600 of FIG. 6 advertises paths between border node pairs that attempt to provide both small weights and sufficient available bandwidth to accommodate new connection requests. For example, FIG. 10 illustrates an example graph 1000 depicting typical weights and available bandwidths for various possible paths between an example border node pair in an example cluster. As illustrated in FIG. 10, the path corresponding to point 1005 is the minimum weight path as it has the smallest weight among the possible paths, but it also has a low available bandwidth (e.g., because paths like this tend to attract many connections due to their small weights). Conversely, the path corresponding to point 1010 is the widest path as it has the highest available bandwidth among the possible paths, but it also has a large weight (e.g., because paths like this tend to discourage connections due to their large weights). Instead of advertising minimum weight paths or widest paths, the hierarchical routing processor 600 selects for advertisement a constrained minimum weight path corresponding to point 1015 in the example graph 1000. As described in greater detail below, a constrained minimum weight path is selected to be the possible path between a pair of border nodes that meets a bandwidth pruning threshold 1020 and that also has the smallest weight among all such possible paths that meet the bandwidth pruning threshold 1020. By appropriate determination of the bandwidth pruning threshold, such constrained minimum weight paths can have sufficient available bandwidth to accommodate new connection requests, and have smaller weights than the corresponding widest paths.

With reference to FIG. 6, the example hierarchical routing processor 600 can determine constrained minimum weight paths to be advertised for a particular cluster as follows. For example, the route advertiser 610 uses the network topology database updated with the weight and available bandwidth state parameters for the internal links of the cluster obtained by the cluster parameter receiver 605 to determine the sets of possible internal paths connecting each pair of border nodes in the cluster, and also determines the weight and available bandwidth state parameters for each of the possible paths. The route advertiser 610 then determines the constrained minimum weight paths connecting border node pairs of a cluster by pruning those possible paths between border node pairs that do not meet the bandwidth pruning threshold set by the criteria determiner 615. Then, for each border node pair, the route advertiser 610 selects the path having the smallest weight from among the possible paths capable of connecting this border node pair that remain after pruning to be the constrained minimum weight path for the border node pair.

The criteria determiner 615 attempts to determine a bandwidth pruning threshold that is sufficiently high to avoid causing a cluster to not be selected for routing due to a perceived lack of available bandwidth. For example, setting pruning thresholds too low can lead to paths that may not meet user bandwidth requirements. However, setting pruning thresholds too high can lead to paths that may be circuitous and so may not meet user delay requirements. In some examples, to determine (or estimate) a bandwidth pruning threshold for use by the route advertiser 610, the criteria determiner 615 obtains load profiles for the connections carried by the network. From these profiles, the probability distributions characterizing the bandwidth requirements of the connections in different classes of service visiting different clusters are generated. Suitable pruning thresholds for each service class for different clusters can be derived from the probability distributions to minimize blocking or, in other words, to yield a high probability for the admission of new connections to be successful. For example, a 95th percentile (or any other percentile) of bandwidth requests received for a service class at a particular cluster may be used to set the pruning threshold for the class for that cluster.

As connection characteristics may change over time, the pruning thresholds determined by the criteria determiner 615 may need to be reviewed at various times (e.g., periodically or aperiodically). Also, since different clusters may have different link speeds (bandwidths) and, thus, the pruning thresholds may need to be adjusted on a per-cluster basis. Furthermore, for any given border node pair of a cluster, there is a possibility that all possible paths connecting the border node pair may have available bandwidths below the pruning threshold. In some examples, when this situation occurs, the widest path connecting the border node pair is selected to be the constrained minimum weight path advertised for this border node pair.

In some examples, the criteria determiner 615 is implemented as part of a capacity management tool that is separate from other elements of the hierarchical routing processor 600. An example of such a capacity management tool simulates the different routing protocols used in a live network, together with their various algorithms and features. The capacity management tool also uploads network data from the live network on a regular (e.g., daily) basis. For example, such network data can include configuration and utilization data of different network elements such as switches, routers, trunks, and fiber spans; descriptions of the established connections in the network, along with their respective service classes, allocated bandwidth and restoration requirements, average and peak loads, and other characteristics; etc. From this uploaded data, the capacity management tool maintains a current view and some history of the network topology, together with the details of the hierarchical clustering structure. In some example, by processing the collected data, the capacity management tool produces various visual map displays and generates reports on a number of network metrics, such as utilization of trunks and ports, delay and hop count distributions of connections, etc. These reports can be used to create the load profiles from which the bandwidth pruning thresholds are determined.

In some examples, the capacity management tool offers a user interface whereby the tool's view of the network can be modified by adding and/or deleting network elements, by changing the hierarchical clustering structure, etc. Any such changes in network topology may affect the paths used by the established connections. In some examples, a user has the option of either rerouting these connections or keeping them on their old paths. An established connection is released if it is not rerouted and its old path no longer exists, for example, due to the deletion of a network element that previously carried the connection. Additionally, the routing of any mix of connections can be analyzed by adding new connections with various characteristics as described above, and/or by deleting selected established connections. Newly added connections are routed according to the established routing protocols, assuming the currently available bandwidth in the network. Through these capabilities, the capacity management tool can also be used as a modeling tool to perform network capacity analysis for traffic growth forecast, and/or to study various design alternatives and trade-offs.

Returning to the discussion of the hierarchical routing processor 600 of FIG. 6, the route advertiser 610 advertises the state parameters of the constrained minimum weight paths for a cluster. When a connection arrives at the cluster (e.g., from an external source cluster that used the information advertised by the route advertiser 610 for routing), the actual path selected by the connection router 630 for the connection to transit the cluster may not necessarily correspond to the constrained minimum weight path whose state parameters were advertised by the route advertiser 610. In some examples, the connection router 630 selects a path through the cluster that connects the border node pair configured for the connection (i.e., the border node pair selected by the connection's source and recorded as routing path information in the connection) and that has a minimum weight from among the available paths meeting the bandwidth required by the connection. As such, this alternative path may actually have a smaller weight than the advertised weight of the constrained minimum weight path and, thus, may improve overall routing. Also, depending on the position of the bottleneck link in the constrained minimum weight path, by using the alternative path, the incoming connection may not necessarily reduce the advertised available bandwidth of the constrained minimum weight path (e.g., because the alternative path may not include the bottleneck link of the constrained minimum weight path and, thus, may not affect the available bandwidth of the constrained minimum weight path).

Figure 11:
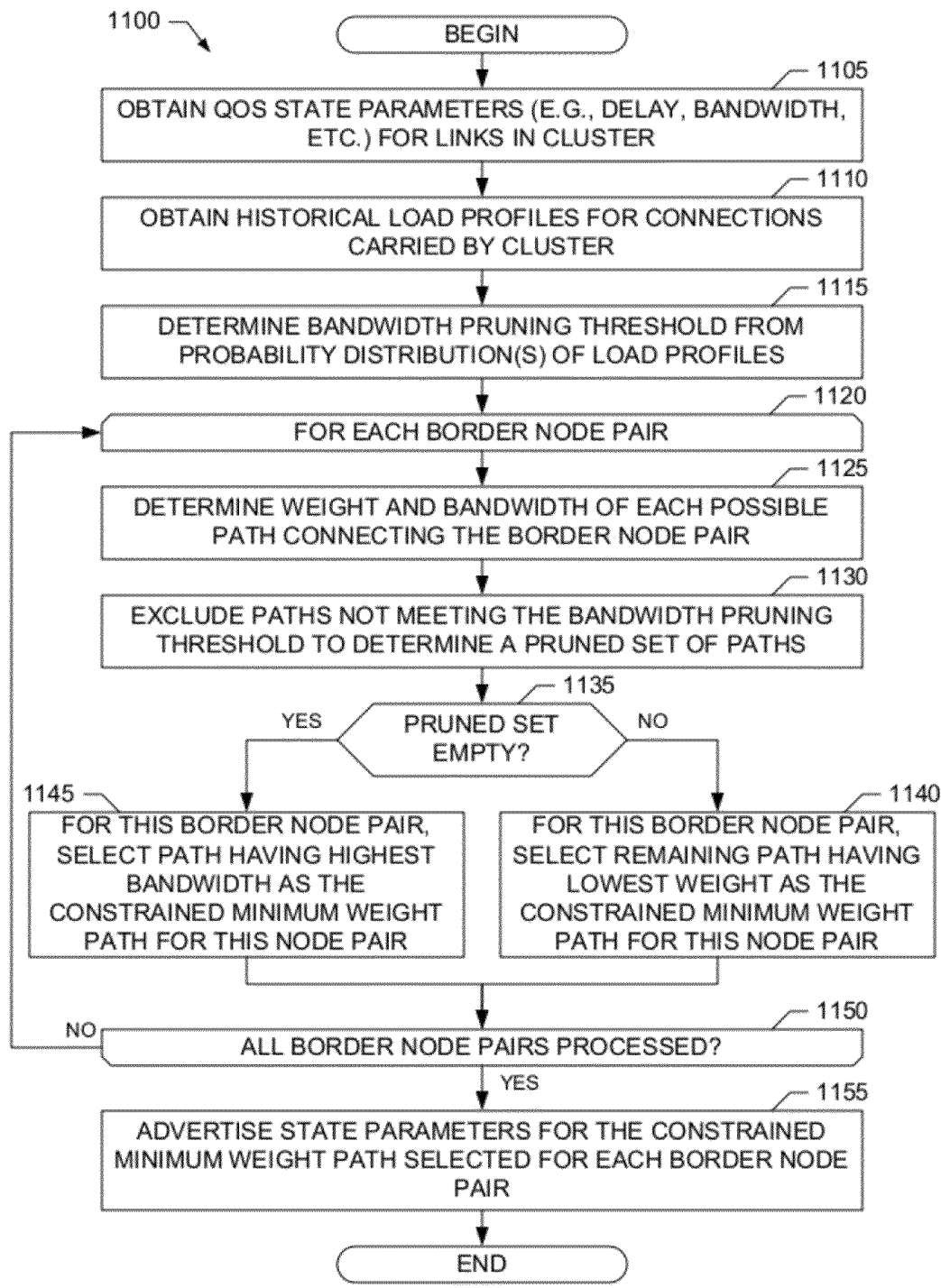
FIG. 11 is a flowchart representative of example machine readable instructions that may be executed to implement constrained minimum weight path determination and advertisement in the hierarchical routing processor of FIG. 6.
Figure 12:
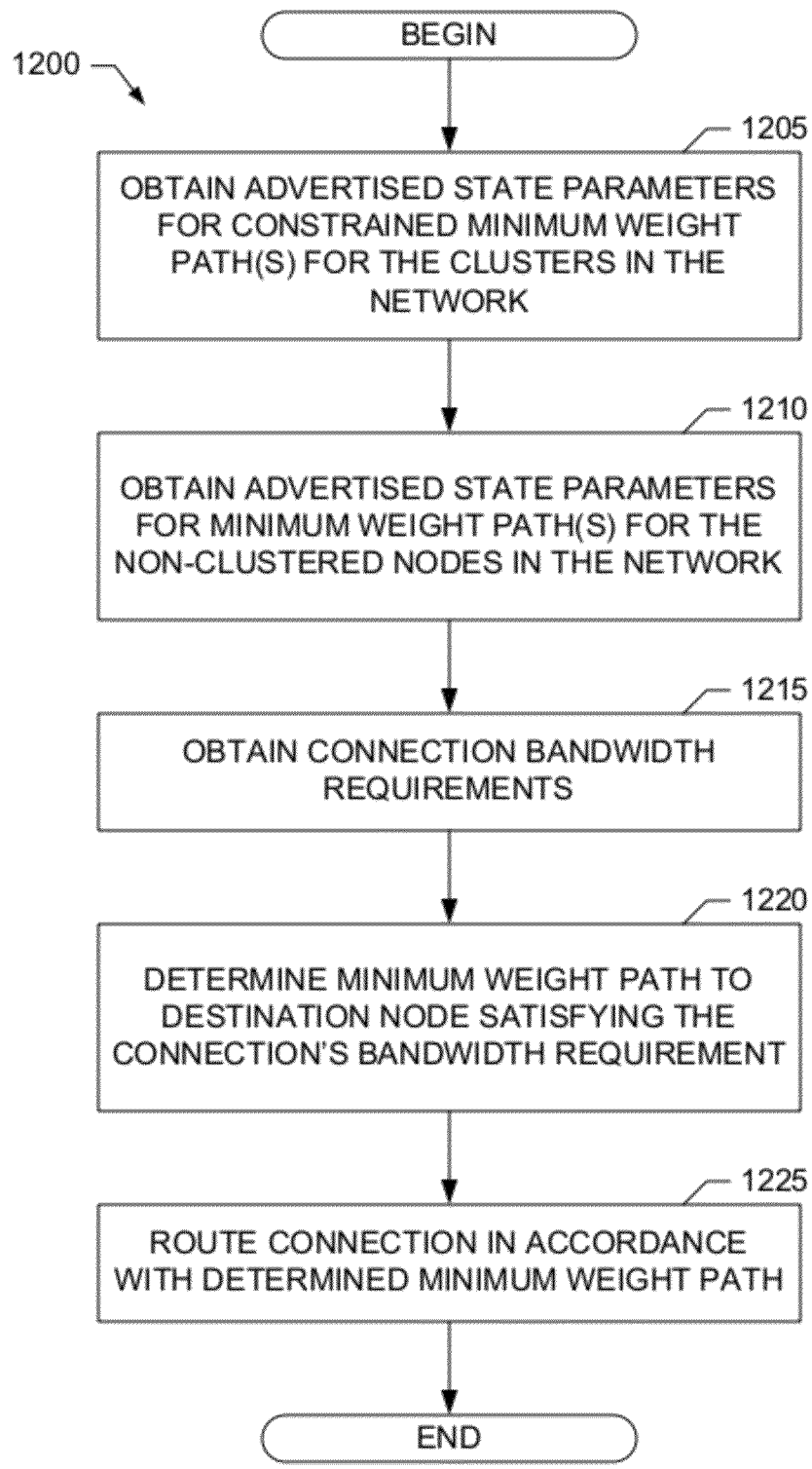
FIG. 12 is a flowchart representative of example machine readable instructions that may be executed to implement connection routing from a source to a destination using advertised routing information in the hierarchical routing processor of FIG. 6.
Figure 13:
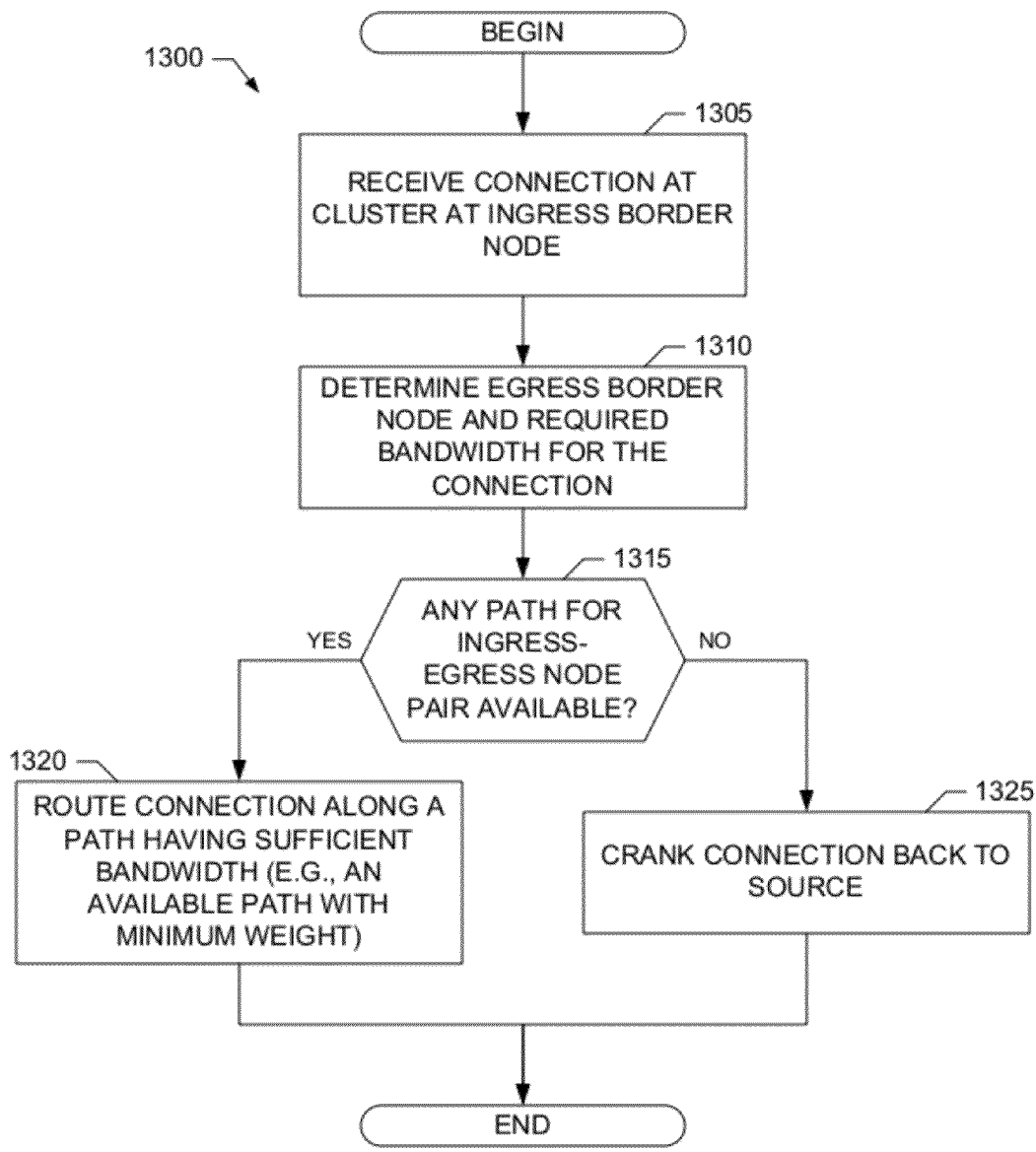
FIG. 13 is a flowchart representative of example machine readable instructions that may be executed to implement connection reception and routing within a cluster in the hierarchical routing processor of FIG. 6.

Flowcharts representative of example machine readable instructions that may be executed to implement, for example, the communication networks 100, 205, 300 and/or 505, the nodes 105A-I, 210, 215, 235, 400, 405, 415, 420, 425 and/or 430, the clusters 115, 120, 125, 135, 200, 220, 225, 230, C1-C3, 410, 500, 510 and/or 515, the hierarchical routing processor 600, the cluster parameter receiver 605, the route advertiser 610, the criteria determiner 615, the route receiver 620, the route generator 625 and/or the connection router 630 are shown in FIGS. 11-13. In these examples, the machine readable instructions represented by each flowchart may comprise one or more programs for execution by a processor, such as the processor 1412 shown in the example processing system 1400 discussed below in connection with FIG. 14. Alternatively, the entire program or programs and/or portions thereof implementing one or more of the processes represented by the flowcharts of FIGS. 11-13 could be executed by a device other than the processor 1412 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 11-13 may be implemented manually. Further, although the example machine readable instructions are described with reference to the flowcharts illustrated in FIGS. 11-13, many other techniques for implementing the example methods and apparatus described herein may alternatively be used. For example, with reference to the flowcharts illustrated in FIGS. 11-13, the order of execution of the blocks may be changed, and/or some of the blocks described may be changed, eliminated, combined and/or subdivided into multiple blocks.

As mentioned above, the example processes of FIGS. 11-13 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 11-13 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Example machine readable instructions 1100 that may be executed to implement constrained minimum weight path determination and advertisement in the hierarchical routing processor 600 of FIG. 6 are represented by the flowchart shown in FIG. 11. The example machine readable instructions 1100 may be executed at predetermined intervals (e.g., based on a timer), based on an occurrence of a predetermined event (e.g., such as receipt of updated state parameters for the internal nodes/clusters and/or links/paths of a cluster managed by the hierarchical routing processor 600), etc., or any combination thereof. With reference to the preceding figures, the machine readable instructions 1100 begin execution at block 1105 of FIG. 11 at which the cluster parameter receiver 605 included in the hierarchical routing processor 600 obtains QoS state parameters, such as the weights and available bandwidths described above, for the internal links connecting the interior and border nodes of a cluster managed by the hierarchical routing processor 600. The cluster parameter receiver 605 also obtains QoS state parameters, such as the weights and available bandwidths described above, for the logical nodes (representing internal clusters) of the cluster. At block 1110, the criteria determiner 615 included in the hierarchical routing processor 600 obtains historical load profiles (e.g., including required bandwidths) for the connections (e.g., across different traffic classes) previously carried by the cluster during a given period of time, as described above.

Next, at block 1115 the criteria determiner 615 determines one or more probability distributions from the load profiles. For example, at block 1115 the criteria determiner 615 can determine a cumulative probability distribution for the connection bandwidths for all traffic classes. Additionally or alternatively, the criteria determiner 615 can determine respective cumulative probability distributions for the connection bandwidths for each of the traffic classes. At block 1115, the criteria determiner 615 also determines a bandwidth pruning threshold using the probability distribution(s) determined from the load profiles. For example, the criteria determiner 615 can determine a bandwidth pruning threshold to include the 95th percentile (or any other percentile) of connection bandwidths over all traffic classes. Additionally or alternatively, the criteria determiner 615 can determine a respective bandwidth pruning threshold for each traffic class.

At block 1120, the route advertiser 610 included in the hierarchical routing processor 600 begins determining a constrained minimum weight path for each pair of border nodes in the cluster. For example, for a particular pair of border nodes, at block 1125 the route advertiser 610 uses the weight and available bandwidth state parameters for the internal links and logical nodes of the cluster obtained at block 1105 to determine each possible path capable of connecting the particular pair of border nodes. The route advertiser 610 also determines the weight and available bandwidth state parameters (and/or any other QoS state parameters) for each of these possible paths capable of connecting the particular pair of border nodes.

At block 1130, the route advertiser 610 excludes possible paths from the set of possible paths determined at block 1125 having available bandwidth state parameters that do not meet (e.g., that are less than) the pruning threshold(s) determined at block 1115. The result is a pruned set of possible paths capable of connecting the particular pair of border nodes.

If the pruned set of possible paths determined at block 1130 is not empty (block 1135), then at block 1140 the route advertiser 610 selects the remaining path having the smallest weight from among the pruned set of possible paths to be the constrained minimum weight path for the particular pair of border nodes. However, if the pruned set of possible paths determined at block 1130 is empty (block 1135) and, thus, there are no possible paths meeting the bandwidth pruning threshold, then at block 1145 the route advertiser 610 selects the path having the highest available bandwidth from among the set of possible paths determined at block 1125 to be the constrained minimum weight path for the particular pair of border nodes.

After all pairs of border nodes have been processed (block 1150), at block 1155 the route advertiser 610 advertises the constrained minimum weight path selected for each pair of border nodes in the cluster. For example, the route advertiser 610 can advertise a constrained minimum weight path for a particular border node by advertising identification information for the particular pair of border nodes and the QoS state parameters (e.g., such as weight and available bandwidth) for the selected constrained minimum weight path connecting this pair of border nodes. After processing at block 1155 completes, execution of the example machine readable instructions 1100 ends.

Example machine readable instructions 1200 that may be executed to implement connection routing from a source to a destination using advertised routing information in the hierarchical routing processor 600 of FIG. 6 are represented by the flowchart shown in FIG. 12. The example machine readable instructions 1200 may be executed at predetermined intervals (e.g., such as to determine routing paths for connections in a background process), based on an occurrence of a predetermined event (e.g., such as when a new connection is to be routed through the network, when new or updated advertised routing information is received from a cluster, etc.), etc., or any combination thereof. With reference to the preceding figures, the machine readable instructions 1200 begin execution at block 1205 of FIG. 12 at which the route receiver 620 included in the hierarchical routing processor 600 obtains the constrained minimum weight paths and associated QoS state parameters (e.g., weight, available bandwidth, etc.) making up the aggregated topology descriptions advertised by different clusters in the network. At block 1210 the route receiver 620 receives QoS state parameters associated with the external links connecting the nodes/clusters in the network. At block 1215, in response to a connection request, the route generator 625 included in the hierarchical routing processor 600 determines the bandwidth requirements for the connection to be routed on demand to a destination node or cluster in the network. Next, at block 1220 the route generator 625 determines a minimum weight routing path through the network to the destination node/cluster of the connection that meets the bandwidth requirements for the connection determined at block 1215 by using the network topology database and the advertised routing information received at block 1205 and 1210. For example, the route generator 625 can use the received advertised routing information to determine some or all of the possible paths with sufficient available bandwidth for routing the connection through one or more transit clusters to the destination node/cluster. The route generator 625 can then select the minimum weight path to be the possible path having the smallest weight. The route generator 625 also records the routing information related to the selected path in the connection. Such information includes the list of transit clusters selected and the corresponding ingress-egress border node pair selected for each transit cluster. Then, at block 1225 the route generator 625 routes the connection to the destination node/cluster in accordance with the minimum weight path determined at block 1220. Execution of the example machine readable instructions 1200 then ends. If at block 1220 the route generator 625 determines that there are no paths through the network to the destination node/cluster of the connection that meets the bandwidth requirements for the connection determined at block 1215, the connection request is refused. Execution of the example machine readable instructions 1200 ends by skipping block 1225. (In some examples, refusal of connection requests are recorded in some network management elements and may result in a need to add capacity to the network.)

In some examples, portions of the example machine readable instructions 1200 can also be executed to pre-determine routing paths for connections in a background process, or when new or updated advertised routing information is received from a cluster, etc. In such examples, the route receiver 620 included in the hierarchical routing processor 600 executes blocks 1205 and 1210 as described above. The route generator 625 included in the hierarchical routing processor 600 skips block 1215. Next, at block 1220 the route generator 625 determines a minimum weight routing path through the network to each destination node/cluster using the network topology database and the advertised routing information received at block 1205 and 1210. For example, the route generator 625 can use the received advertised routing information to determine some or all of the possible paths for routing through one or more transit clusters to each destination node/cluster. The route generator 625 can then select, for each destination node/cluster, the minimum weight path to be the possible path having the smallest weight. These selected paths are recorded in a connection routing table for later use. Execution of the example machine readable instructions 1200 then ends by skipping block 1225. When a connection request arrives sometime later, a path can be looked up from the connection routing table for routing, rather than executing the machine readable instructions 1200 as described in the previous paragraph. If the retrieved path does not have a sufficient bandwidth to carry the connection, the connection request is refused.

Example machine readable instructions 1300 that may be executed to implement connection reception and routing within a cluster in the hierarchical routing processor 600 of FIG. 6 are represented by the flowchart shown in FIG. 13. The example machine readable instructions 1300 may be executed, for example, when a connection is received at a cluster managed by the hierarchical routing processor 600. With reference to the preceding figures, the machine readable instructions 1300 begin execution at block 1305 of FIG. 13 at which the connection router 630 included in the hierarchical routing processor 600 detects reception of a connection at an ingress border node of a cluster. At block 1310 the connection router 630 determines the destination border node of the cluster to which the connection is to be routed (e.g., based on the routing path information accompanying the connection). The connection router 630 also determines the bandwidth required for the connection.

Next, at block 1315 the connection router 630 selects a path from among the set of possible paths internal to the cluster between the ingress and egress border node pair that that has a minimum weight from among all possible paths in the set of possible paths with sufficient bandwidth to carry the connection. Such a path may or may not be the constrained minimum weight path advertised for connecting the ingress and egress border node pair. (Note that the constrained minimum weight path being advertised was selected according to the bandwidth pruning threshold, whereas the minimum weight path determined here for carrying the connection is selected according to the connection's bandwidth requirements.) If such a path is available (block 1315), the connection router 630 routes the connection along the path to the egress border node (block 1320). However, if such a path is not available (block 1315), the connection router 630 cranks the connection back to source node of the connection to try an alternative path that does not transit the current cluster (block 1325). (Note that there is a possibility for crankback, for example, due to an excessively high volume of connection requests that depleted the available bandwidth of the advertised constrained minimum weight path, and because of time delays the source node was not yet updated with new information on available bandwidth at the time when the connection request was made.) Execution of the example machine readable instructions 1300 then ends.

Figure 14:
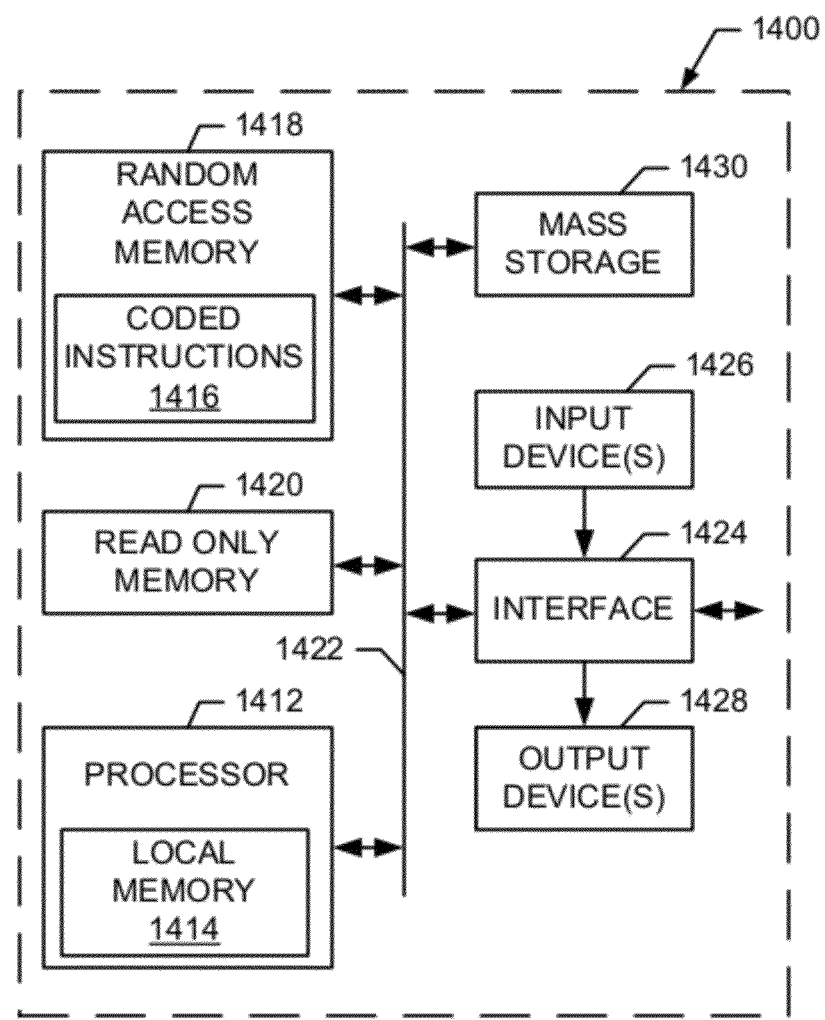
FIG. 14 is a block diagram of an example processing system that may execute the example machine readable instructions of FIGS. 11-13 to implement the hierarchical routing processor of FIG. 6.

FIG. 14 is a block diagram of an example processing system 1400 capable of implementing the apparatus and methods disclosed herein. The processing system 1400 can be, for example, a server, a personal computer, a personal digital assistant (PDA), an Internet appliance, a DVD player, a CD player, a digital video recorder, a personal video recorder, a set top box, or any other type of computing device.

The system 1400 of the instant example includes a processor 1412 such as a general purpose programmable processor. The processor 1412 includes a local memory 1414, and executes coded instructions 1416 present in the local memory 1414 and/or in another memory device. The processor 1412 may execute, among other things, the machine readable instructions represented in FIGS. 11-13. The processor 1412 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 1412 is in communication with a main memory including a volatile memory 1418 and a non-volatile memory 1420 via a bus 1422. The volatile memory 1418 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1420 may be implemented by flash memory and/or any other desired type of memory device. Access to the main memory 1418, 1420 is typically controlled by a memory controller (not shown).

The processing system 1400 also includes an interface circuit 1424. The interface circuit 1424 may be implemented by any type of interface standard, such as an Ethernet interface, a universal serial bus (USB), and/or a third generation input/output (3GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, an isopoint and/or a voice recognition system.

One or more output devices 1428 are also connected to the interface circuit 1424. The output devices 1428 can be implemented, for example, by display devices (e.g., a liquid crystal display, a cathode ray tube display (CRT)), by a printer and/or by speakers. The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1400 also includes one or more mass storage devices 1430 for storing software and data. Examples of such mass storage devices 1430 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A hierarchical routing method for a communication network, the method comprising:

determining, using a processor, respective ones of a plurality of constrained weighted paths to connect respective ones of a plurality of different pairs of border nodes of a cluster in the communication network, each constrained weighted path having a respective bandwidth and a respective weight, a first one of the constrained weighted paths to represent a routing connection between a first one of the pairs of border nodes of the cluster, the first one of the constrained weighted paths being selected, based on a bandwidth threshold, from a first set of at least two possible paths capable of connecting the first one of the pairs of border nodes; and advertising, using the processor, the plurality of constrained weighted paths determined for the cluster, the advertising to advertise the first one of the constrained weighted paths selected to represent the routing connection between the first one of the pairs of border nodes instead of advertising any other possible path in the first set capable of connecting the first one of the pairs of border nodes, the first one of the constrained weighted paths being advertised by advertising at least a first bandwidth parameter and a first weight parameter for the first one of the constrained weighted paths.

2. The method as defined in claim 1 wherein the first one of the constrained weighted paths corresponds to a first possible path from the first set of at least two possible paths, the first possible path having a minimum weight among the possible paths in the first set of at least two possible paths having bandwidths that meet or exceed the bandwidth threshold.

3. The method as defined in claim 2 wherein the method further comprises, when none of the possible paths in the first set of at least two possible paths have bandwidths that meet or exceed the bandwidth threshold, setting the first one of the constrained weighted paths to a second possible path having a highest bandwidth among the possible paths in the first set of at least two possible paths.

4. The method as defined in claim 1 wherein the cluster comprises a plurality of nodes, the plurality of nodes include border nodes and interior nodes, and determining the plurality of constrained weighted paths comprises:

obtaining a plurality of state parameters corresponding to a respective plurality of links capable of connecting respective pairs of nodes in the cluster;

processing the obtained plurality of state parameters to determine the first set of at least two possible paths capable of connecting the first pair of border nodes; and pruning the first set of at least two possible paths based on the bandwidth threshold to determine the first one of the constrained weighted paths for representing the routing connection between the first one of the pairs of border nodes.

5. The method as defined in claim 4 wherein pruning the first set of at least two possible paths comprises:

excluding from the first set of at least two possible paths a possible path whose bandwidth is less than the bandwidth threshold to determine a first pruned set of possible paths;

if the first pruned set of possible paths is not empty, selecting a possible path having a lowest weight from among the first pruned set of possible paths to be the first one of the constrained weighted paths for representing the routing connection between the first one of the pairs of border nodes; and if the first pruned set of possible paths is empty, selecting a possible path having a highest bandwidth from among the first set of at least two possible paths to be the first one of the constrained weighted paths for representing the routing connection between the first one of the pairs of border nodes.

6. The method as defined in claim 1 wherein advertising the plurality of constrained weighted paths comprises advertising the respective bandwidth and the respective weight for each of the constrained weighted paths determined for the cluster.

7. The method as defined in claim 1 further comprising:
receiving the plurality of constrained weighted paths advertised for the cluster; and
determining a minimum weight route through the communication network for a connection, the route including the first one of the constrained weighted paths.

8. The method as defined in claim 7 wherein the first one of the constrained weighted paths is to connect first and second border nodes of the cluster, and the method further comprises:
receiving the connection at the first border node of the cluster;
routing the connection through the cluster to the second border node via the first one of the constrained weighted paths if the first one of the constrained weighted paths is available; and
if the first one of the constrained weighted paths is unavailable, routing the connection through the cluster to the second border node via a different available path having bandwidth sufficient to carry the connection.

9. The method as defined in claim 1 further comprising:
obtaining a load profile for connections previously carried by the cluster; and
setting the bandwidth threshold based on a percentile of connection bandwidth requests included in the load profile.

10. A tangible machine readable medium comprising machine readable instructions which, when executed, cause a machine to perform operations comprising:
selecting, based on a bandwidth threshold, a constrained weighted path for representing a routing connection between a pair of border nodes of a cluster in a communication network from a set of possible paths capable of connecting the pair of border nodes, the constrained weighted path having a bandwidth and a weight; and
advertising a plurality of constrained weighted paths determined for the cluster, respective ones of the constrained weighted paths to represent one respective routing connection between respective ones of a plurality of different pairs of border nodes of the cluster, each of the constrained weighted paths having a respective bandwidth and a respective weight, the advertising to advertise a first one of the constrained weighted paths selected to represent a routing connection between a first one of the pairs of border nodes instead of advertising any other possible path in the first set capable of connecting the first one of the pairs of border nodes, the first one of the constrained weighted paths being advertised by advertising at least a first bandwidth parameter and a first weight parameter for the first one of the constrained weighted paths.

11. The tangible machine readable medium as defined in claim 10 wherein the first one of the constrained weighted paths corresponds to a first possible path from the first set of at least two possible paths, the first possible path having a minimum weight among all possible paths in the first set of at least two possible paths having bandwidths that meet or exceed the bandwidth threshold.

12. The tangible machine readable storage medium as defined in claim 11 wherein the operations further comprise, when none of the possible paths in the first set of at least two possible paths have bandwidths that meet or exceed the bandwidth threshold, setting the first one of the constrained weighted paths to a second possible path having a largest bandwidth among the possible paths in the first set of at least two possible paths.

13. The tangible machine readable medium as defined in claim 10 wherein the cluster comprises a plurality of nodes, the plurality of nodes includes border nodes and interior nodes, and the operation further comprise:
obtaining a plurality of state parameters corresponding to a respective plurality of links capable of connecting respective pairs of nodes in the cluster;
processing the obtained plurality of state parameters to determine the first set of at least two possible paths capable of connecting the first one of the pairs of border nodes; and
pruning the first set of at least two possible paths based on the bandwidth threshold to determine the first one of the constrained weighted paths to represent the routing connection between the first one of the pairs of border nodes.

14. The tangible machine readable medium as defined in claim 13 wherein the operation further comprise:
excluding from the first set of at least two possible paths a possible path whose bandwidth is less than the bandwidth threshold to determine a first pruned set of possible paths;
selecting a possible path having a lowest weight from among the first pruned set of possible paths to be the first one of the constrained weighted paths to represent the routing connection between the first one of the pairs of border nodes if the first pruned set of possible paths is not empty; and
selecting a possible path having a highest bandwidth from among the first set of at least two possible paths to be the first one of the constrained weighted paths to represent the routing connection between the first one of the pairs of border nodes if the first pruned set of possible paths is empty.

15. An apparatus comprising:
a memory having machine readable instructions stored thereon; and
a processor to execute the instructions to perform operations comprising:
advertising a plurality of constrained weighted paths to represent respective routing connections between a respective plurality of different pairs of border nodes of a cluster in a communication network, the constrained weighted paths having respective bandwidths and respective weights, the plurality of constrained weighted paths being selected, based on a bandwidth threshold, from respective sets of possible paths through the cluster for connecting the respective plurality of different pairs of border nodes, the advertising to advertise a first one of the constrained weighted paths selected to represent a routing connection between a first one of the pairs of border nodes instead of advertising any other possible path in a first set of at least two possible paths capable of connecting the first one of the pairs of border nodes, the first one of the constrained weighted paths being advertised by advertising at least a first bandwidth parameter and a first weight parameter for the first one of the constrained weighted paths; and
receiving a connection to be routed from a first border node of the cluster to a second border node of the cluster.

16. An apparatus as defined in claim 15 wherein the cluster comprises a plurality of border nodes and interior nodes, and the operations further comprise:
- obtaining a plurality of quality of service state parameters corresponding to a respective plurality of links capable of connecting respective pairs of nodes in the cluster; and
- processing the obtained plurality of state parameters to determine the respective sets of possible paths through the cluster for connecting the respective plurality of pairs of border nodes, each possible path being characterized by a respective bandwidth and a respective weight.

17. An apparatus as defined in claim 16 wherein the operations further comprise:
- determining, based on the bandwidth threshold, a plurality of pruned sets of possible paths for connecting the respective plurality of pairs of border nodes;
- for each respective pruned set of possible paths, if the respective pruned set of possible paths is not empty, selecting a possible path having a lowest weight from among the respective pruned set of possible paths to be a respective constrained weighted path for representing a routing connection between a respective pair of border nodes capable of being connected by a respective set of possible paths from which the respective pruned set of possible paths was generated; and
- for each respective pruned set of possible paths, if the respective pruned set of possible paths is empty, selecting a possible path having a highest bandwidth from among the respective set of possible paths from which the respective pruned set of possible paths was generated to be the respective constrained weighted path for representing the routing connection between the respective pair of border nodes capable of being connected by the respective set of possible paths.

18. An apparatus as defined in claim 15 wherein the operations further comprise:
- selecting a respective minimum weight path from among the possible paths in each respective set of possible paths having bandwidths meeting or exceeding the bandwidth threshold to be a constrained weighted path for the respective pair of border nodes capable of being connected by the respective set of possible paths; and
- for each respective set of possible paths having no path whose bandwidth meets or exceeds the bandwidth threshold, selecting a respective highest bandwidth path from the respective set of possible paths for the respective pair of border nodes capable of being connected by the respective set of possible paths.

19. An apparatus as defined in claim 15 wherein the operations further comprise routing the connection from the first border node to the second border node via a first path connecting the first and second border nodes if the first path has sufficient bandwidth to carry the connection and the first path has a lowest weight among a set of one or more paths having sufficient bandwidth to carry the connection from the first border to the second border node.

20. An apparatus as defined in claim 19 wherein the operations further comprise cranking the connection back to a source of the connection outside the cluster if no path connecting the first and second border nodes has sufficient bandwidth to carry the connection.

\* \* \* \* \*